US012675507B2

(12) United States Patent
Hao et al.

(10) Patent No.: US 12,675,507 B2
(45) Date of Patent: Jul. 7, 2026

(54) DATA PROCESSING METHOD

(71) Applicant: BEIJING BAIDU NETCOM SCIENCE TECHNOLOGY CO., LTD., Beijing (CN)

(72) Inventors: Siyuan Hao, Beijing (CN); Le Zhang, Beijing (CN); Le Dai, Beijing (CN); Jingbo Zhou, Beijing (CN); Shengming Zhang, Beijing (CN); Chuan Qin, Beijing (CN); Hui Xiong, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 10 days.

(21) Appl. No.: 18/741,744

(22) Filed: Jun. 12, 2024

(65) Prior Publication Data

US 2024/0330328 A1     Oct. 3, 2024

(30) Foreign Application Priority Data

Jun. 13, 2023    (CN) .......................... 202310701024.9

(51) Int. Cl.
*G06F 16/28*          (2019.01)
(52) U.S. Cl.
CPC .................... *G06F 16/288* (2019.01)

(58) Field of Classification Search
CPC ...................................................... G06F 16/288
USPC .......................................................... 707/740
See application file for complete search history.

(56) References Cited

FOREIGN PATENT DOCUMENTS

| | | | | |
|---|---|---|---|---|
| CN | 110851662 A | * | 2/2020 | ............. G06N 3/084 |
| CN | 113158033 A | * | 7/2021 | ............. G06Q 10/40 |
| CN | 113505294 A | * | 10/2021 | ............. G06N 20/00 |
| CN | 113569906 A | * | 10/2021 | ............. G06N 3/045 |

* cited by examiner

*Primary Examiner* — Giovanna B Colan
(74) *Attorney, Agent, or Firm* — MASCHOFF BRENNAN; Liang Huang

(57)              ABSTRACT

A method is provided. The method includes: obtaining an object relationship diagram; for a target object of a plurality of first objects, obtaining at least one meta-path corresponding to the target object in the object relationship diagram; for each meta-path, performing the following operations: determining a plurality of first attention weights of the target object based on inherent attribute data of the target object and inherent attribute data of each of a plurality of second objects on the meta-path; obtaining a second representation vector of the target object based on a first representation vector of the target object and the plurality of first attention weights; and obtaining a target indicator prediction result of the target object based at least on at least one second representation vector of the target object corresponding to the at least one meta-path.

20 Claims, 8 Drawing Sheets

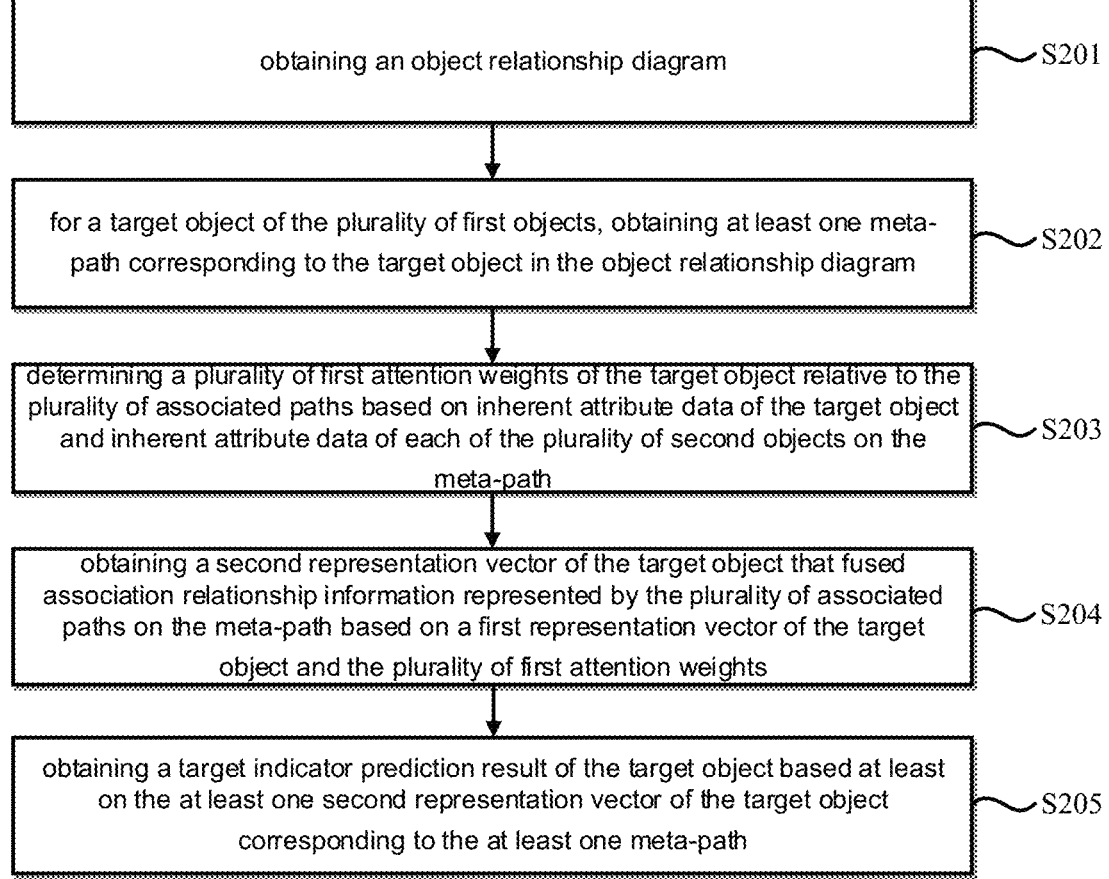

obtaining an object relationship diagram ⟶ S201 for a target object of the plurality of first objects, obtaining at least one meta-path corresponding to the target object in the object relationship diagram ⟶ S202 determining a plurality of first attention weights of the target object relative to the plurality of associated paths based on inherent attribute data of the target object and inherent attribute data of each of the plurality of second objects on the meta-path ⟶ S203 obtaining a second representation vector of the target object that fused association relationship information represented by the plurality of associated paths on the meta-path based on a first representation vector of the target object and the plurality of first attention weights ⟶ S204 obtaining a target indicator prediction result of the target object based at least on the at least one second representation vector of the target object corresponding to the at least one meta-path ⟶ S205

FIG. 2

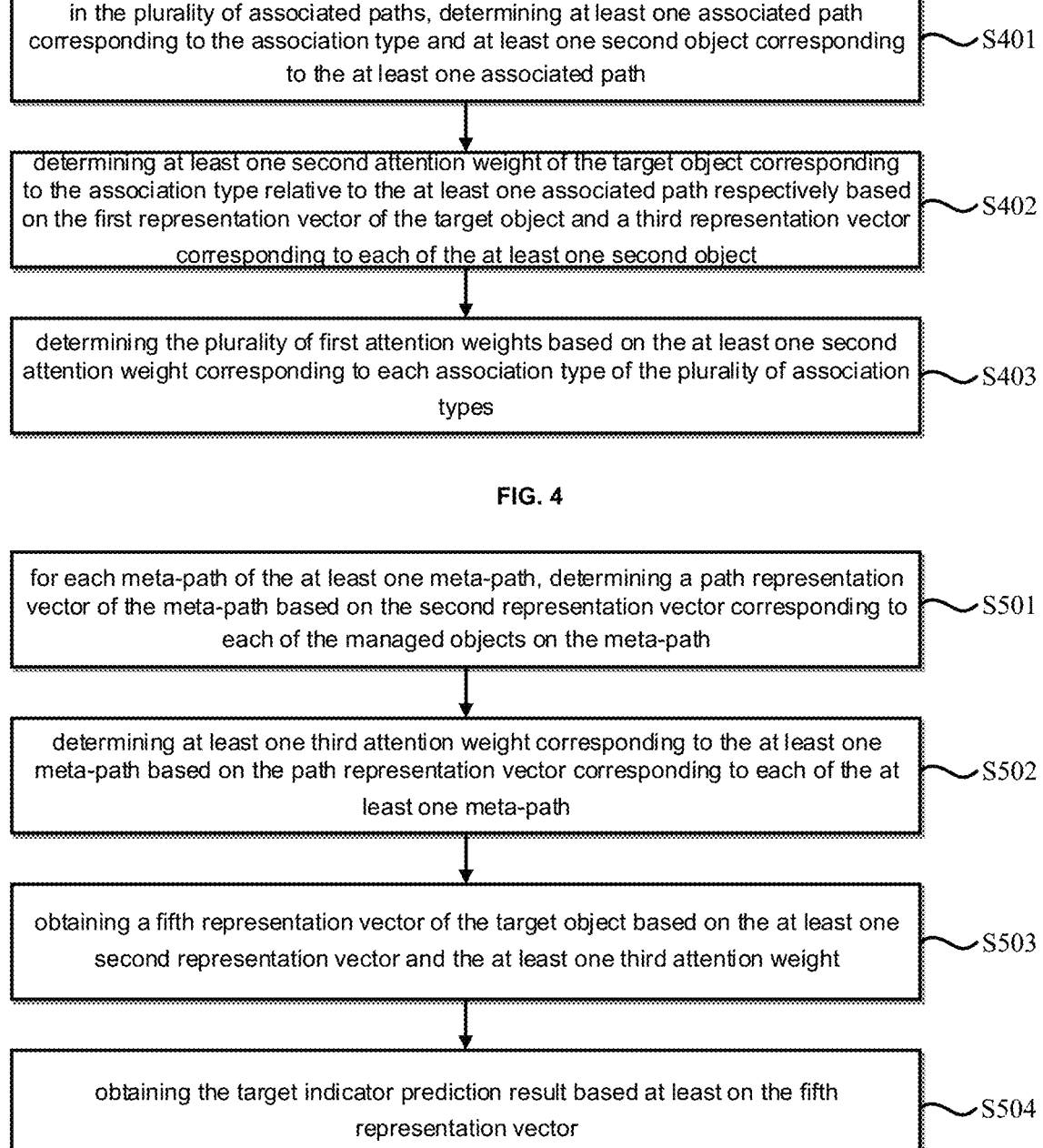

in the plurality of associated paths, determining at least one associated path corresponding to the association type and at least one second object corresponding to the at least one associated path ~S401 determining at least one second attention weight of the target object corresponding to the association type relative to the at least one associated path respectively based on the first representation vector of the target object and a third representation vector corresponding to each of the at least one second object ~S402 determining the plurality of first attention weights based on the at least one second attention weight corresponding to each association type of the plurality of association types ~S403

FIG. 4 for each meta-path of the at least one meta-path, determining a path representation vector of the meta-path based on the second representation vector corresponding to each of the managed objects on the meta-path ~S501 determining at least one third attention weight corresponding to the at least one meta-path based on the path representation vector corresponding to each of the at least one meta-path ~S502 obtaining a fifth representation vector of the target object based on the at least one second representation vector and the at least one third attention weight ~S503 obtaining the target indicator prediction result based at least on the fifth representation vector ~S504

FIG. 5

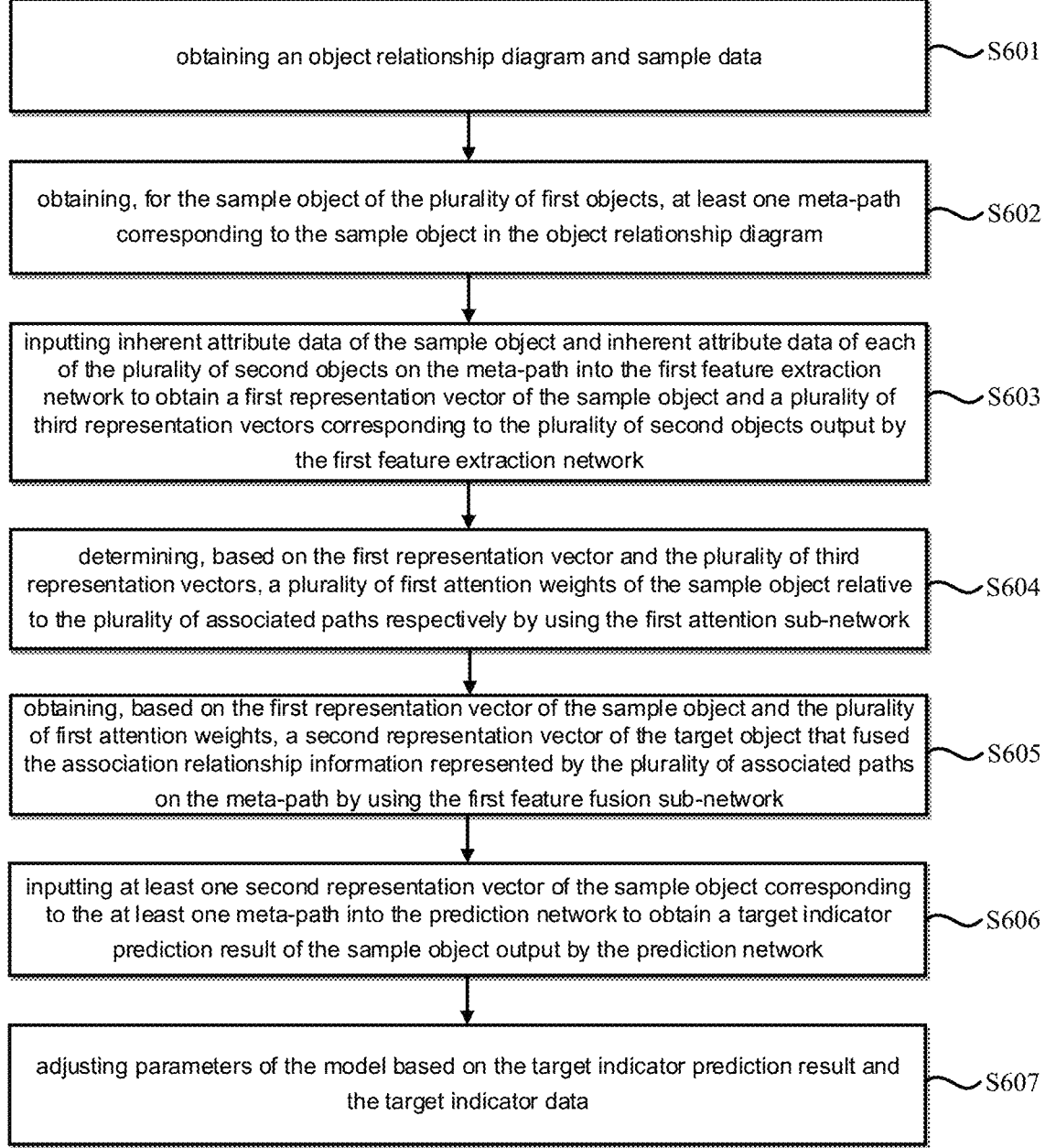

obtaining an object relationship diagram and sample data — S601 obtaining, for the sample object of the plurality of first objects, at least one meta-path corresponding to the sample object in the object relationship diagram — S602 inputting inherent attribute data of the sample object and inherent attribute data of each of the plurality of second objects on the meta-path into the first feature extraction network to obtain a first representation vector of the sample object and a plurality of third representation vectors corresponding to the plurality of second objects output by the first feature extraction network — S603 determining, based on the first representation vector and the plurality of third representation vectors, a plurality of first attention weights of the sample object relative to the plurality of associated paths respectively by using the first attention sub-network — S604 obtaining, based on the first representation vector of the sample object and the plurality of first attention weights, a second representation vector of the target object that fused the association relationship information represented by the plurality of associated paths on the meta-path by using the first feature fusion sub-network — S605 inputting at least one second representation vector of the sample object corresponding to the at least one meta-path into the prediction network to obtain a target indicator prediction result of the sample object output by the prediction network — S606 adjusting parameters of the model based on the target indicator prediction result and the target indicator data — S607

FIG. 6

DATA PROCESSING METHOD

CROSS-REFERENCE TO RELATED APPLICATIONS

The present application claims priority to Chinese Patent Application No. 202310701024.9 filed on Jun. 13, 2023, which is incorporated herein by reference in its entirety.

TECHNICAL FIELD

The present disclosure relates to the field of artificial intelligence technology, particularly to the field of deep learning, data processing, and specifically to a data processing method, a model training method, an electronic device, and a computer-readable storage medium.

BACKGROUND

Artificial intelligence is the discipline of studying how computers can simulate certain thinking processes and intelligent behaviors of a human being (such as learning, reasoning, thinking, planning, etc.), and there are both hardware-level and software-level technologies. The artificial intelligence hardware technologies generally include technologies such as sensors, special artificial intelligence chips, cloud computing, distributed storage, big data processing, etc. The artificial intelligence software technologies mainly include computer vision technology, speech recognition technology, natural language processing technology, machine learning/deep learning, big data processing technology, knowledge diagram technology and other major technological directions.

The methods described in this section are not necessarily methods that have been previously conceived or employed. Unless otherwise indicated, it should not be assumed that any method described in this section is considered to be the prior art only due to its inclusion in this section. Similarly, the problems mentioned in this section should not be assumed to be recognized in any prior art unless otherwise indicated.

SUMMARY

The present disclosure provides a data processing method, a model training method, an electronic device, and a computer-readable storage medium.

According to an aspect of the present disclosure, a data processing method is provided, comprising: obtaining an object relationship diagram, wherein the object relationship diagram comprises a plurality of first nodes corresponding to a plurality of first objects and is used to represent association relationship information among the plurality of first objects; obtaining, for a target object of the plurality of first objects, at least one meta-path corresponding to the target object in the object relationship diagram, wherein each meta-path of the at least one meta-path is a node path for connecting the target object and an associated object of the target object in the object relationship diagram, and the target object determines a plurality of associated paths with a plurality of second objects other than the target object in the meta-path, respectively; performing, for each meta-path of the at least one meta-path, following operations: determining, based on inherent attribute data of the target object and inherent attribute data of each of the plurality of second objects on the meta-path, a plurality of first attention weights of the target object relative to the plurality of associated paths respectively; and obtaining, based on a first representation vector of the target object and the plurality of first attention weights, a second representation vector of the target object that fused association relationship information represented by the plurality of associated paths on the meta-path, wherein the first representation vector is determined based on the inherent attribute data of the target object; and obtaining, based at least on at least one second representation vector of the target object corresponding to the at least one meta-path, a target indicator prediction result of the target object.

According to another aspect of the present disclosure, there is provided a model training method, the model comprises a first feature extraction network and a prediction network, the first feature extraction network comprises a first feature extraction sub-network, a first attention sub-network and a first feature fusion sub-network, and the model training method comprises: obtaining an object relationship diagram and sample data, where the object relationship diagram comprises a plurality of first nodes corresponding to a plurality of first objects and is used to represent association relationship information between the plurality of first objects, the sample data comprises inherent attribute data and target indicator data of a sample object, and the sample object is one of the plurality of first objects; for the sample object of the plurality of first objects, obtaining at least one meta-path corresponding to the sample object in the object relationship diagram, each meta-path of the at least one meta-path is a node path for connecting the sample object and an associated object of the sample object in the object relationship diagram, and the sample object determines a plurality of associated paths with a plurality of second objects other than the sample object in the meta-path, respectively; for each meta-path in the at least one meta-path, performing the following operations: inputting the inherent attribute data of the sample object and the inherent attribute data of each of the plurality of second objects on the meta-path into the first feature extraction network to obtain a first representation vector of the sample object and a plurality of third representation vectors corresponding to the plurality of second objects output by the first feature extraction network; determining a plurality of first attention weights of the sample object relative to the plurality of associated paths by using the first attention sub-network based on the first representation vector and the plurality of third representation vectors; and obtaining a second representation vector of the target object that fused the association relationship information represented by the plurality of associated paths on the meta-path by using the first feature fusion sub-network based on the first representation vector of the sample object and the plurality of first attention weights; inputting at least one second representation vector of the sample object corresponding to the at least one meta-path into the prediction network to obtain a target indicator prediction result of the sample object output by the prediction network; and adjusting parameters of the model based on the target indicator prediction result and the target indicator data.

According to another aspect of the present disclosure, an electronic device is provided, comprising: one or more processors; and a memory storing one or more programs configured to be executed by the one or more processors, the one or more programs comprising instructions for: obtaining an object relationship diagram, wherein the object relationship diagram comprises a plurality of first nodes corresponding to a plurality of first objects and is used to represent association relationship information among the plurality of first objects; obtaining, for a target object of the plurality of first objects, at least one meta-path corresponding to the target object in the object relationship diagram, wherein each meta-path of the at least one meta-path is a node path for connecting the target object and an associated object of the target object in the object relationship diagram, and the target object determines a plurality of associated paths with a plurality of second objects other than the target object in the meta-path, respectively; performing, for each meta-path of the at least one meta-path, following operations: determining, based on inherent attribute data of the target object and inherent attribute data of each of the plurality of second objects on the meta-path, a plurality of first attention weights of the target object relative to the plurality of associated paths respectively; and obtaining, based on a first representation vector of the target object and the plurality of first attention weights, a second representation vector of the target object that fused association relationship information represented by the plurality of associated paths on the meta-path, wherein the first representation vector is determined based on the inherent attribute data of the target object; and obtaining, based at least on at least one second representation vector of the target object corresponding to the at least one meta-path, a target indicator prediction result of the target object.

According to another aspect of the present disclosure, a non-transitory computer-readable storage medium is provided, storing one or more programs comprising instructions that, when executed by one or more processors of a computing device, cause the computing device to perform operations comprising: obtaining an object relationship diagram, wherein the object relationship diagram comprises a plurality of first nodes corresponding to a plurality of first objects and is used to represent association relationship information among the plurality of first objects; obtaining, for a target object of the plurality of first objects, at least one meta-path corresponding to the target object in the object relationship diagram, wherein each meta-path of the at least one meta-path is a node path for connecting the target object and an associated object of the target object in the object relationship diagram, and the target object determines a plurality of associated paths with a plurality of second objects other than the target object in the meta-path, respectively; performing, for each meta-path of the at least one meta-path, following operations: determining, based on inherent attribute data of the target object and inherent attribute data of each of the plurality of second objects on the meta-path, a plurality of first attention weights of the target object relative to the plurality of associated paths respectively; and obtaining, based on a first representation vector of the target object and the plurality of first attention weights, a second representation vector of the target object that fused association relationship information represented by the plurality of associated paths on the meta-path, wherein the first representation vector is determined based on the inherent attribute data of the target object; and obtaining, based at least on at least one second representation vector of the target object corresponding to the at least one meta-path, a target indicator prediction result of the target object.

It should be understood that the content described in this section is not intended to identify key or important features of the embodiments of the present disclosure, nor is it intended to limit the scope of the present disclosure. Other features of the present disclosure will become readily understood from the following description.

BRIEF DESCRIPTION OF THE DRAWINGS

The drawings exemplarily illustrate embodiments and constitute a part of the specification, and are used in conjunction with the textual description of the specification to explain the example implementations of the embodiments. The illustrated embodiments are for illustrative purposes only and do not limit the scope of the claims. Throughout the drawings, like reference numerals refer to similar but not necessarily identical elements.

FIG. 2 illustrates a flowchart of a data processing method according to some embodiments of the present disclosure.

FIG. 4 illustrates a flowchart for determining a first attention weight according to some embodiments of the present disclosure.

FIG. 5 illustrates a flowchart of a method for obtaining a target indicator prediction result of a target object according to some embodiments of the present disclosure.

FIG. 6 illustrates a flowchart of a model training method according to some embodiments of the present disclosure.

EMBODIMENTS

The example embodiments of the present disclosure are described below in conjunction with the accompanying drawings, including various details of the embodiments of the present disclosure to facilitate understanding, and they should be considered as example only. Therefore, one of ordinary skill in the art will recognize that various changes and modifications may be made to the embodiments described herein without departing from the scope of the present disclosure. Similarly, descriptions of well-known functions and structures are omitted in the following description for the purpose of clarity and conciseness.

In the present disclosure, unless otherwise specified, the terms "first", "second" and the like are used to describe various elements and are not intended to limit the positional relationship, timing relationship, or importance relationship of these elements, and such terms are only used to distinguish one element from another. In some examples, the first element and the second element may refer to the same instance of the element, while in some cases they may also refer to different instances based on the description of the context.

The terminology used in the description of the various examples in this disclosure is for the purpose of describing particular examples only and is not intended to be limiting. Unless the context clearly indicates otherwise, if the number of elements is not specifically defined, the element may be one or more. In addition, the terms "and/or" used in the present disclosure encompass any one of the listed items and all possible combinations thereof.

Embodiments of the present disclosure will be described in detail below with reference to the accompanying drawings.

Figure 1:
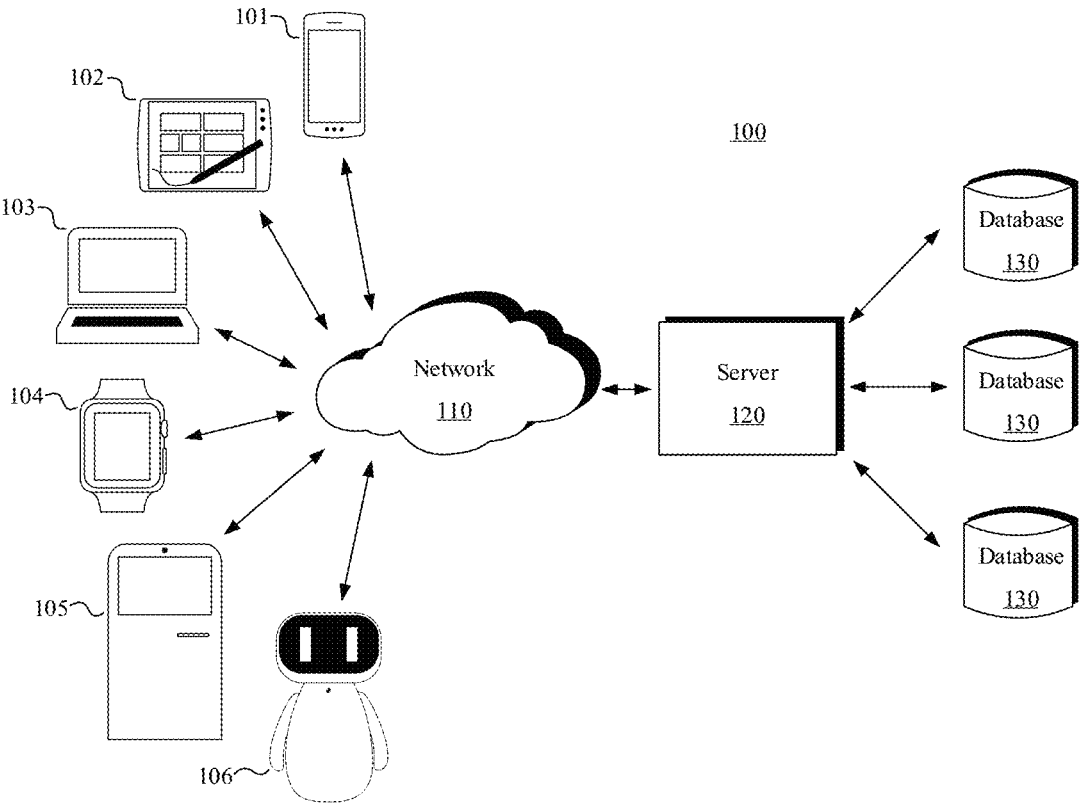
FIG. 1 illustrates a schematic diagram of an example system in which various methods described herein may be implemented according to embodiments of the present disclosure.

FIG. 1 illustrates a schematic diagram of an example system 100 in which various methods and apparatuses described herein may be implemented in accordance with embodiments of the present disclosure. Referring to FIG. 1, the system 100 includes one or more client devices 101, 102, 103, 104, 105 and 106, a server 120, and one or more communication networks 110 that couple one or more client devices to the server 120. The client devices 101, 102, 103, 104, 105, and 106 may be configured to execute one or more applications.

In embodiments of the present disclosure, the server 120 may run one or more services or software applications that enable execution of the data processing method or the model training method.

In some embodiments, the server 120 may also provide other services or software applications, which may include non-virtual environments and virtual environments. In some embodiments, these services may be provided as web-based services or cloud services, such as to the user of the client devices 101, 102, 103, 104, 105, and/or 106 under a Software as a Service (Saas) model.

In the configuration shown in FIG. 1, the server 120 may include one or more components that implement functions performed by the server 120. These components may include software components, hardware components, or a combination thereof that are executable by one or more processors. A user operating the client devices 101, 102, 103, 104, 105, and/or 106 may sequentially utilize one or more client applications to interact with the server 120 to utilize the services provided by these components. It should be understood that a variety of different system configurations are possible, which may be different from the system 100. Therefore, FIG. 1 is an example of a system for implementing the various methods described herein and is not intended to be limiting.

The user may use the client devices 101, 102, 103, 104, 105, and/or 106 to obtain the prediction result of a target indicator of a target object. The client devices may provide an interface that enables the user of the client devices to interact with the client devices. The client devices may also output information to the user via the interface. Although FIG. 1 depicts only six client devices, those skilled in the art will be able to understand that the present disclosure may support any number of client devices.

The client devices 101, 102, 103, 104, 105, and/or 106 may include various types of computer devices, such as portable handheld devices, general-purpose computers, such as personal computers and laptop computers, workstation computers, wearable devices, smart screen devices, self-service terminal devices, service robots, gaming systems, thin clients, various messaging devices, sensors, or other sensing devices, and the like. These computer devices may run various types and versions of software applications and operating systems, such as Microsoft Windows, Apple IOS, Unix-like operating systems, Linux or Linux-like operating systems (e.g., Google Chrome OS); or include various mobile operating systems, such as Microsoft Windows Mobile OS, iOS, Windows Phone, Android. The portable handheld devices may include cellular telephones, smart phones, tablet computers, personal digital assistants (PDAs), and the like. The wearable devices may include head-mounted displays, such as smart glasses, and other devices. The gaming systems may include various handheld gaming devices, Internet-enabled gaming devices, and the like. The client devices can perform various different applications, such as various applications related to the Internet, communication applications (e.g., e-mail applications), Short Message Service (SMS) applications, and may use various communication protocols.

The network 110 may be any type of network well known to those skilled in the art, which may support data communication using any of a variety of available protocols (including but not limited to TCP/IP, SNA, IPX, etc.). By way of example only, one or more networks 110 may be a local area network (LAN), an Ethernet-based network, a token ring, a wide area network (WAN), an Internet, a virtual network, a virtual private network (VPN), an intranet, an external network, a blockchain network, a public switched telephone network (PSTN), an infrared network, a wireless network (for example, Bluetooth, WiFi), and/or any combination of these and/or other networks.

The server 120 may include one or more general-purpose computers, a dedicated server computer (e.g., a PC (personal computer) server, a UNIX server, a mid-end server), a blade server, a mainframe computer, a server cluster, or any other suitable arrangement and/or combination. The server 120 may include one or more virtual machines running a virtual operating system, or other computing architectures involving virtualization (e.g., one or more flexible pools of a logical storage device that may be virtualized to maintain virtual storage devices of a server). In various embodiments, the server 120 may run one or more services or software applications that provide the functions described below.

The computing unit in the server 120 may run one or more operating systems including any of the operating systems described above and any commercially available server operating system. The server 120 may also run any of a variety of additional server applications and/or intermediate layer applications, including a HTTP server, an FTP server, a CGI server, a Java server, a database server, etc.

In some implementations, the server 120 may include one or more applications to analyze and merge data feeds and/or event updates received from the user of the client devices 101, 102, 103, 104, 105, and/or 106. The server 130 may also include one or more applications to display the data feeds and/or the real-time events via one or more display devices of the client devices 101, 102, 103, 104, 105, and/or 106.

In some embodiments, the server 120 may be a server of a distributed system, or a server incorporating a blockchain. The server 120 may also be a cloud server, or an intelligent cloud computing server or an intelligent cloud host with an artificial intelligence technology. The cloud server is a host product in a cloud computing service system to overcome the defects of management difficulty and weak service expansibility exiting in a traditional physical host and virtual private server (VPS) service.

The system 100 may also include one or more databases 130. In certain embodiments, these databases may be used to store data and other information. For example, one or more of the databases 130 may be used to store information such as audio files and video files. The databases 130 may reside in various locations. For example, the database used by the server 120 may be local to the server 120, or may be remote from the server 120 and may communicate with the server 120 via a network-based or dedicated connection. The databases 130 may be of different types. In some embodiments, the database used by the server 120 may be, for example, a relational database. One or more of these databases may store, update, and retrieve data to and from the database in response to a command.

In some embodiments, one or more of the databases 130 may also be used by an application to store application data.

The databases used by the application may be different types of databases, such as a key-value repository, an object repository, or a conventional repository supported by a file system.

The system 100 of FIG. 1 may be configured and operated in various ways to enable application of various methods and apparatuses described according to the present disclosure.

According to an embodiment of the present disclosure, as shown in FIG. 2, there is provided a data processing method, comprising:

Step S201, obtaining an object relationship diagram, wherein the object relationship diagram comprises a plurality of first nodes corresponding to a plurality of first objects and is used to represent association relationship information among the plurality of first objects;

Step S202, for a target object of the plurality of first objects, obtaining at least one meta-path corresponding to the target object in the object relationship diagram, wherein each meta-path of the at least one meta-path is a node path for connecting the target object and an associated object of the target object in the object relationship diagram, and the target object determines a plurality of associated paths with a plurality of second objects other than the target object in the meta-path, respectively;

For each meta-path of the at least one meta-path, performing the following operations:

Step S203, determining a plurality of first attention weights of the target object relative to the plurality of associated paths based on inherent attribute data of the target object and inherent attribute data of each of the plurality of second objects on the meta-path; and Step S204, obtaining a second representation vector of the target object that fused association relationship information represented by the plurality of associated paths on the meta-path based on a first representation vector of the target object and the plurality of first attention weights, and the first representation vector is determined based on the inherent attribute data of the target object; and Step S205, obtaining a target indicator prediction result of the target object based at least on the at least one second representation vector of the target object corresponding to the at least one meta-path.

Therefore, by constructing an object relationship network, association relationship information between each first object is recorded (for example, including at least one of an association relationship between funds, a social relationship between fund managers, and a management relationship between a fund manager and a fund); meanwhile, for each meta-path related to the target fund, an attention weight is obtained for each associated path existing on the meta-path, and then feature fusion is performed based on the attention weights to obtain a first representation vector, and then the prediction of the target indicator is performed, such that the association relationship information included in each meta-path can be fused into the representation vector of the target object, and the prediction accuracy of the target indicator of the target object can be improved.

In some scenarios, when predicting the target indicator of a target object, if only the inherent data of the target object is considered, some connections that objectively exist between objects are usually ignored, which in turn leads to the prediction accuracy not being able to meet the expectation.

For example, in a financial scenario, the measurement and assessment of the performance of a fund usually only take into account explicit information features of the fund itself, such as fund return, fund scale and popularity, as well as the impact of an individual fund manager on managed funds, and the fund performance is evaluated using conventional statistical calculation methods.

In actual scenarios, there are also certain inherent association relationships between funds (for example, a similar relationship between the funds). In an example embodiment of the present disclosure, by introducing the inherent association relationships into the prediction of the target indicator (for example, the performance of the fund) of the target object in a certain way, the accuracy of the prediction thereof can be improved.

In some embodiments, the target object may be a target fund, and the target indicator may be the performance of the target fund (for example, may be represented as the yield of the fund). A plurality of funds in the market may be taken as the plurality of first objects, and each first object is represented as a first node in an object relationship diagram, and in response to the similar relationship between two funds, the first nodes corresponding to the two funds are connected by a node path to form the object relationship diagram between the plurality of funds.

In some embodiments, the similar relationship between two funds may be determined by calculating the similarity between the two funds in terms of their positions based on the proportion of each stock in which the two funds hold a position (for example, if the similarity is greater than a first similarity threshold, it is determined that there is an association relationship between the two funds).

In some embodiments, based on the target object (a target fund), all associated objects (associated funds) in the object relationship diagram having an association relationship with the target object, that is, first objects in the object relationship diagram that can be indirectly connected to the target object by node paths, can be determined; subsequently, each path via which the target object connects to each associated object can be determined as at least one meta-path of the target object.

In some embodiments, each meta-path includes a target object and a plurality of second objects other than the target object, and on the meta-path, the target object and each second object form an associated path, respectively.

Figure 3:
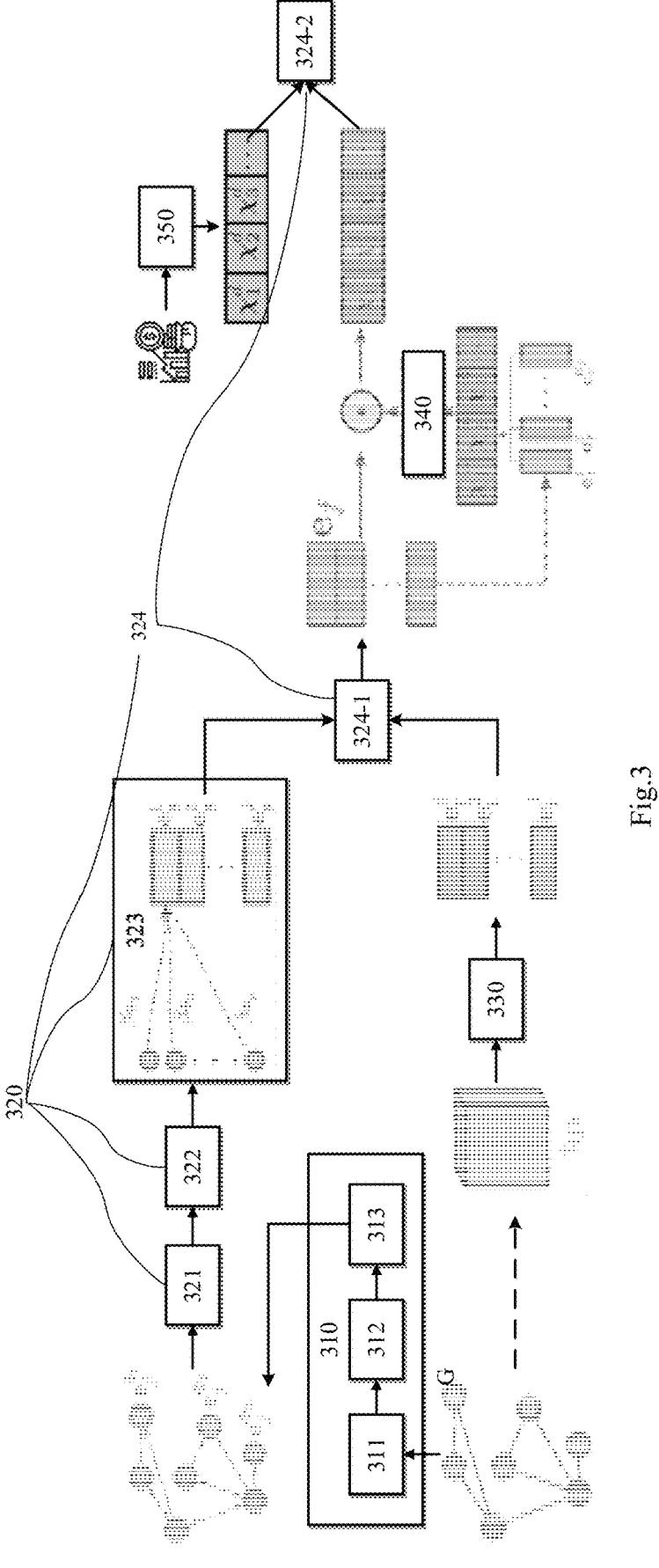
FIG. 3 illustrates an architectural schematic diagram of a model for predicting a target indicator of a target object according to some embodiments of the present disclosure.

FIG. 3 illustrates an architectural schematic diagram of a model for predicting a target indicator of a target object, according to an exemplary embodiment of the present disclosure.

In some embodiments, the model 300 shown in FIG. 3 may be a fund performance prediction model, the model 300 may include a first feature extraction network 310 and a prediction network 320. The first feature extraction network 310 may include a first feature extraction sub-network 311, a first attention sub-network 312, and a first feature fusion sub-network 313.

In some embodiments, for each of at least one meta-path, the inherent attribute data of the target object and the second object on the meta-path may first be obtained, where the inherent attribute data of each object may be represented as an inherent attribute vector $h_j$. Subsequently, the inherent attribute vector $h_j$ of each object may be input into a feature extraction network (e.g., the first feature extraction sub-network 311 in the first feature extraction network 310 shown in FIG. 3) to obtain the first representation vector of the target object and the representation vector of each second object, and the processing described above may be represented as the following equation:

$$h'_j = M_{f_j} \cdot h_j$$

where $M_{f_j}$ is a feature transformation matrix (i.e., the parameter matrix of the feature extraction network), and $h_j'$ denotes the representation vector of each object.

In some embodiments, the inherent attribute data may include, but is not limited to, at least one of the service life of the fund, the scale of the fund at inception, and the shares of the fund at inception.

In some embodiments, the representation vectors of each fund on the meta-path may be spliced to obtain the representation vectors of all the associated paths on the meta-path, and the first attention weight of the representation vector of each associated path may be obtained based on an attention mechanism (e.g., inputting the representation vectors of all the associated paths into the first attention sub-network 312 in the first feature extraction network 310 shown in FIG. 3 to obtain the first attention weight of the representation vector of each associated path output by the first attention sub-network 312); subsequently, the representation vector of the target object may be weighted based on the first attention weights corresponding to the plurality of associated paths that associated with the target object (e.g., by applying the first feature fusion sub-network 313 in the first feature extraction network 310 shown in FIG. 3), thereby obtaining the representation of the target object on that meta-path (i.e., the second representation vector).

Subsequently, the second representation vector of the target object corresponding to each meta-path may be input into a prediction network (e.g., the prediction network 320 shown in FIG. 3) to obtain the target indicator prediction result of the target object (the prediction result for the fund performance) output by the prediction network.

According to some embodiments, the plurality of first objects include a plurality of managing subjects and a plurality of managed objects, the target object and each of the plurality of second objects are managed objects, the plurality of associated paths include a plurality of association types, and the plurality of association types include at least two of the following types: direct association between two managed objects, indirect association between two managed objects based on at least one managing subject, indirect association between two managed objects based on at least one managed object, and indirect association between two managed objects based on at least one managing subject and at least one managed object.

Moreover, as shown in FIG. 4, determining the plurality of first attention weights of the target object relative to the plurality of associated paths based on the inherent attribute data of the target object and the inherent attribute data of each of the plurality of second objects on the meta-path comprises: for each association type of the plurality of association types, performing the following operations: step S401, in the plurality of associated paths, determining at least one associated path corresponding to the association type and at least one second object corresponding to the at least one associated path; and step S402, determining at least one second attention weight of the target object corresponding to the association type relative to the at least one associated path respectively based on the first representation vector of the target object and a third representation vector corresponding to each of the at least one second object, and the third representation vector is determined based on the inherent attribute data of the corresponding second object; and step S403, determining the plurality of first attention weights based on the at least one second attention weight corresponding to each association type of the plurality of association types.

Therefore, the associated paths can be further divided into a plurality of path types, and the attention weight of each path of each type is calculated respectively, so that the association type information is further fused into the representation vector, and the prediction accuracy of the target indicator is further improved.

In some embodiments, in a fund performance prediction scenario, on the basis of the foregoing, association relationships, such as an management relationship between a fund manager and a fund, an association relationship between fund managers (e.g., where two fund managers are employed by the same company at the same time), may be further introduced, therefore, by mining the inherent association relationship in the related data, richer feature information is provided for the prediction of the target indicator of the target object, thus further improving the prediction accuracy thereof.

In some embodiments, each meta-path may include a target fund and one or more associated funds (i.e., managed objects), and in some cases, may further include one or more fund managers (i.e., managing subjects). Wherein, in response to a fund manager managing a certain fund, there is an association relationship between the fund manager and the fund, which is connected via a node path; and in response to there being an association relationship between the fund managers (e.g., two fund managers belonging to the same company), the two fund manager nodes may be connected via a node path.

In some embodiments, on each meta-path, there may be multiple association relationships between a target fund and its associated funds, including direct association relationships (i.e., directly connected via a node path) and indirect association relationships (i.e., indirectly connected via one or more other nodes), wherein the indirect association relationships may include an indirect association based on at least one fund, an indirect association based on at least one fund manager, and an indirect association based on at least one fund manager and at least one fund.

In some embodiments, the managing subjects may further include a company that employs the fund manager, and the object relationship diagram may further include an employment relationship between the company and the fund manager it employs and an association relationship between two companies (e.g., a cooperative relationship, an affiliation relationship, a relationship in terms of shareholding, etc.), and in response to having an above relationship, two nodes may be connected via a node path.

Therefore, the employment relationship between the company and the fund manager, the association relationship between the companies, and the like may be further introduced, such that richer feature information can be provided for the prediction of the target indicator of the target object by mining the inherent association relationship in the related data, thus further improving the accuracy of the prediction.

In some embodiments, the object relationship diagram described above may be represented as a node relationship network G shown in FIG. 3.

In some embodiments, for each meta-path $\Phi$, the representation vector of each associated path may be obtained by concatenating the representation vector $$h'_j$$

of target fund j and the representation vector $h_i'$ of the associated fund i on the meta-path $\Phi$.

In some embodiments, the plurality of associated paths described above may include a plurality of association types $\Phi^1, \Phi^2 \ldots \Phi^{K_i}$. When obtaining the first attention weight of each associated path, the representation vectors of all associated paths associated with the target fund with the same association type may be input into the first attention sub-network 312 in the first feature extraction network 310 shown in FIG. 3 to obtain the second attention weight of the representation vector of each associated path of the association type output by the first attention sub-network 312.

In some embodiments, the processing of the first attention subnetwork 312 may be represented by the following equations:

$$q_{ij}^{\Phi^k} = ReLU\left(a_{\Phi^k}^T . Concat\left(h_i', h_j'\right)\right)$$

$$\alpha_{ij}^{\Phi^k} = softmax_j\left(q_{ij}^{\Phi^k}\right) = \frac{\exp\left(q_{ij}^{\Phi^k}\right)}{\sum \exp\left(q_{ij}^{\Phi^k}\right)}$$

Where $$\alpha_{ij}^{\Phi^k}$$

denotes the second attention weight corresponding to the associated path of the association type $$a_{\Phi^k}^T$$

formed by target fund j and the associated fund i, $$a_{\Phi^k}^T$$

is a parameter vector, $$q_{ij}^{\Phi^k}$$

can denote the representation vector corresponding to each associated path, where $k \in [1, 2, \ldots K_t]$.

According to some embodiments, obtaining the second representation vector of the target object that fused the association relationship information represented by the plurality of associated paths on the meta-path comprises: for each association type of the plurality of association types, obtaining a fourth representation vector corresponding to the association type based on the first representation vector of the target fund and at least one second attention weight of the plurality of first attention weights corresponding to the association type; and concatenating the plurality of fourth representation vectors corresponding to the plurality of association types to obtain the second representation vector.

Therefore, in the feature fusion stage, feature fusion is performed for each association type based on the attention weight information corresponding to the type, respectively, and the representation vectors corresponding to each association type are subsequently spliced, such that the association type information is further fused into the representation vectors of the target object, thereby improving the prediction accuracy of the target indicator of the target object.

In some embodiments, the first representation vector $$h_j'$$

and the second attention weight $$\alpha_{ij}^{\Phi^k}$$

corresponding to each associated path of each association type may be input into the first feature fusion sub-network 313 to obtain the second representation vector of the target fund on the meta-path.

In some embodiments, the processing of the first feature fusion sub-network 313 may be represented by the following equation:

$$e_j^\Phi = Concat\left(\sum_{j \in \mathcal{N}_j^{\Phi^1}} \alpha_{ij}^{\Phi^1} \cdot h_j', \ldots, \sum_{j \in \mathcal{N}_j^{\Phi^{K_t}}} \alpha_{ij}^{\Phi^{K_t}} \cdot h_j'\right)$$

Where $$e_j^\Phi$$

denotes the second representation vector of target fund j on the meta-path $\phi$.

According to some embodiments, the number of the at least one meta-path is a plurality and, as shown in FIG. 5, obtaining the target indicator prediction result of the target object based at least on at least one second representation vector of the target object corresponding to the at least one meta-path may comprise: step S501, for each meta-path of the at least one meta-path, determining a path representation vector of the meta-path based on the second representation vector corresponding to each of the managed objects on the meta-path; step S502, determining at least one third attention weight corresponding to the at least one meta-path based on the path representation vector corresponding to each of the at least one meta-path; step S503, obtaining a fifth representation vector of the target object based on the at least one second representation vector and the at least one third attention weight; and step S504, obtaining the target indicator prediction result based at least on the fifth representation vector.

Therefore, for the plurality of meta-paths associated with the target object, the representation vector of the path is determined based on the representation vector corresponding to each object on each path; and then, the attention weight of each path is obtained based on the representation vector of each path, and the representation vector of the target object corresponding to each path is weighted based on the path attention weight, such that the path information is further fused into the representation vector, and thereby improving the prediction accuracy of the target indicator of the target object.

In some embodiments, for example, in a fund performance prediction scenario, for target fund j, it may have a plurality of meta-paths $\Phi_p$ (where p is a positive integer and $p \in [1, P]$, and P denotes the number of meta-paths corresponding to target fund j), where the plurality of meta-paths $\Phi_p$ form a set of meta-paths $\Phi_P$.

In some embodiments, for each associated fund on each meta-path, each associated fund may be taken as a target fund, respectively, and the second representation vector of the associated fund on the meta-path is obtained by using the method described above.

In some embodiments, in the model 300 shown in FIG. 3, the prediction network 320 may include a second feature fusion sub-network 321, a second attention sub-network 322, a third feature fusion sub-network 323, and a first prediction sub-network 324.

In some embodiments, the second representation vectors corresponding to all the fund objects on a meta-path may be input into a feature fusion network (e.g., the second feature fusion sub-network 321 in the prediction network 320 shown in FIG. 3) to obtain the path representation vector corresponding to the meta-path.

In some embodiments, the processing of the second feature fusion sub-network 321 may be represented by the following equation:

$$\omega_{\Phi_p} = \frac{1}{|\mathcal{V}|} \sum_{j \in \mathcal{V}} d^T \cdot \tanh\left(W \cdot e_j^{\Phi_p} + b\right)$$

where $\omega_{\Phi_p}$ denotes the path representation vector of the meta-path $\Phi_p$, $$e_j^{\Phi_p}$$

denotes the second representation vector of fund j on the meta-path $\Phi_p$, V denotes the total number of funds included on the meta-path $\Phi_p$, the d, W and b are all model parameters.

In some embodiments, the path representation vector corresponding to each meta-path described above may be input into an attention network (e.g., the second attention sub-network 322 in the prediction network 320 shown in FIG. 3) to obtain the third attention weight corresponding to each meta-path.

In some embodiments, the processing of the second attention subnetwork 322 may be represented by the following equation:

$$\beta_{\Phi_p} = \frac{\exp(\omega_{\Phi_p})}{\sum_{p=1}^{P} \exp(\omega_{\Phi_p})}$$

where $\beta_{\Phi_p}$ is the third attention weight of the meta-path $\Phi_p$.

Subsequently, the second representation vector and the corresponding third attention weight of the target fund on each meta-path may be input into a feature fusion network (e.g., the third feature fusion sub-network 323 in the prediction network 320 shown in FIG. 3) to obtain the fifth representation vector of the target fund that fused information of each meta-path.

In some embodiments, the processing of the third feature fusion sub-network 323 may be represented by the following equation:

$$e_g^j = \sum_{p=1}^{P} \beta_{\Phi_p} \cdot e_{\Phi_p}$$

where $$e_g^j$$

denotes the fifth representation vector of target fund j, and $e_{\Phi_p}$ denotes the second representation vector of target fund j on the meta-path $\Phi_p$.

Subsequently, the fifth representation vector may be input into the first prediction sub-network 324 in the prediction network 320 as shown in FIG. 3 to obtain the performance prediction result of the target fund.

In some embodiments, the object relationship network may further include meta-paths in which the target fund and the associated funds are directly connected, and for this type of meta-path, the representation vector corresponding to each fund may be the first representation vector corresponding to the fund obtained by the method described above.

In some embodiments, the path representation vector of the meta-path may be obtained similarly as described above and be introduced into the process of the path attention weight calculation and subsequent feature fusion, so that richer path information can be further introduced, thereby improving the accuracy of subsequent prediction.

According to some embodiments, each managed object of the plurality of managed objects is composed of a plurality of sub-objects in proportion, and the data processing method described above may further comprise: obtaining tensor data corresponding to the object relationship diagram, wherein the tensor data is used to record proportion data of each sub-object corresponding to each managed object in the object relationship diagram; and performing tensor decomposition on the tensor data to obtain a sixth representation vector corresponding to each managed object in the object relationship diagram, wherein the sixth representation vector is used to represent a component feature of corresponding managed object; and wherein the obtaining, based at least on the fifth representation vector, the target indicator prediction result comprises: performing feature fusion on the fifth representation vector and the sixth representation vector of the target object to obtain a seventh representation vector of the target object; and obtaining, based at least on the seventh representation vector, the target indicator prediction result.

Therefore, the inherent component features of the target object can be further fused into the representation vector of the target object, thereby improving the prediction accuracy of the target indicator of the target object.

In some embodiments, such as a fund performance prediction scenario, the inherent component feature of the target object may be an investment feature of the target fund in stocks, for example, may be the percentage of positions of the target fund in each of the stocks in which the target fund has a position.

In some embodiments, the object relationship diagram may further include stock nodes, and if a fund holds a position in a stock, the two nodes may be connected by a node path.

In some embodiments, the inherent representation of each fund may also be obtained by the following way: firstly, management-investment tensor T may be obtained based on the object relationship diagram, where each element therein $t_{ijk} \in T$ represents the percentage of the position in stock k held by fund j that is managed by fund manager i, If fund j managed by fund manager i does not hold stock k, the $t_{ijk}$ is assigned a value of 0.

In some embodiments, tensor decomposition may be performed on the management-investment tensor T through a tensor decomposition network to obtain three implicit vectors U, V, Z of the tensor, which represent fund manager preferences, fund investment representations, and stock inherent feature, respectively.

In some embodiments, the tensor decomposition network may measure the loss between the basic real value and the predicted value of each element of the management-investment tensor by using a mean square error (MSE) and perform training for the tensor decomposition network based on the loss. Wherein, the predicted value of each element $\widehat{t_{ijk}}$ may be calculated by the following equation:

$$\widehat{t_{ijk}} = U_i^T V_j + U_i^T Z_k + V_j^T Z_k$$

the loss $\mathcal{L}_{\mathcal{T}}$ between the basic real value and the predicted value of each element in the management-investment tensor may be represented by the following equation:

$$\mathcal{L}_{\mathcal{T}} = \sum_{(i,j,k)} \|t_{ijk} - \widehat{t_{ijk}}\|^2$$
$$= \sum_{(i,j,k)} \|t_{ijk} - (U_i^T V_j + U_i^T Z_k + V_j^T Z_k)\|^2$$

In this way, the inherent representation V of the fund can be obtained.

In some embodiments, the model 300 shown in FIG. 3 may further include a tensor decomposition network 330, and the first prediction sub-network 324 may include a third feature fusion sub-network 324-1 and a second prediction sub-network 324-2.

In some embodiments, the tensor decomposition may be implemented by applying the tensor decomposition network 330.

In some embodiments, after the fund investment representation V is obtained, a vector corresponding to the target fund may be obtained therein as the investment representation of the target fund (i.e., the sixth representation vector), and then the fifth representation vector and the sixth representation vector of the target fund may be input into the third feature fusion sub-network 324-1 to obtain an inherent representation vector of the target fund (i.e., the seventh representation vector), which is a representation vector that fused information of each dimension of the target fund, and then the seventh representation vector is input into the second prediction sub-network 324-2 for fund performance prediction, such that a more accurate prediction result can be obtained.

In some embodiments, the processing of the third feature fusion subnetwork 324-1 may be represented by the following equation:

$$e_f = e_g + e_t$$

Where $e_g$ denotes the fifth representation vector of the fund, $e_t$ denotes the sixth representation vector of the fund, and $e_f$ denotes the seventh representation vector of the fund.

According to some embodiments, the target indicator prediction result includes a target indicator prediction value of the target object on a target date, and the data processing method may further include: performing, for each first date of at least one first date prior to the target date, following operations: determining, based on the target dynamic attribute data on the first date, a preset number of third objects in the plurality of managed objects, wherein difference between the dynamic attribute data of the third object and the target dynamic attribute data is less than difference between the target dynamic attribute data and the dynamic attribute data of other managed object other than the third object in the plurality of managed objects; and performing feature fusion on seventh representation vector corresponding to each third object of the preset number of third objects to obtain a first dynamic feature representation vector corresponding to the first date; and wherein the obtaining, based at least on the seventh representation vector, the target indicator prediction result comprises: obtaining, based at least on the seventh representation vector of the target object and the first dynamic feature representation vector corresponding to each first date of the at least one first date, the target indicator prediction value of the target object on the target date.

The number of third objects may be preset, dynamically set, experimentally set, or set in other approaches, which are all included in the scope of the disclosure. For example, the number may be dynamically set or adjusted by the machine without human input in the machine learning/training process.

Therefore, some dynamic feature information (e.g., overall dynamic change information of the market on a daily basis) can be further fused into the representation vector of the target object, thereby improving the prediction accuracy of the target indicator of the target object.

In some embodiments, in a fund performance prediction scenario, fund market factors (e.g., dynamic fund market trend) may be further introduced into the prediction process for the target fund performance.

In some embodiments, the fund market feature may be approximately represented based on inherent representations of funds. For example, the fund market feature may be the average of the inherent representations of $K_f$ funds (e.g., a preset number of third objects) which are most closely related to fund market changes.

In some embodiments, the $K_f$ funds closest to the fund market trend on the first date can be determined by comparing the difference between the fund market yield and the fund yield of each fund on the first date.

In some embodiments, the yield on the first date can be determined by the cumulative net asset value on the current day and the cumulative net asset value on the previous day. For example, if the cumulative net asset value of fund j on day t is Values$_t$ and the cumulative net asset value on day t−1 is Values$_{t-1}$, the fund yield on day t may be calculated by the following equation:

$$r_t^j = \frac{\text{Values}_{t+1} - \text{Values}_t}{\text{Values}_t} \times 100\%$$

The market yield $$r_t^m$$

on day t may be obtained in a similar way based on the market cumulative net asset value on day t and the market cumulative net asset value on day t−1.

The difference between the fund market yield $$r_t^m$$

and the fund yield $$r_t^j$$

of fund j on day t can be represented as:

$$d_j = |r_t^j - r_t^m| (j = 1, 2, \ldots, N_g)$$

Subsequently, the $K_f$ funds having least differences are obtained, and the dynamic feature representation vector of the fund market on day t is obtained based on the inherent representation vectors of the $K_f$ funds:

$$\chi_t^m = \frac{1}{K_f} \sum_{j=1}^{K_f} e_f^j$$

In some embodiments, the seventh representation vector of the target fund and the first dynamic feature representation vector on each first date prior to the target date may be input into the second prediction sub-network 324-2 to obtain the fund performance prediction result of the target fund on the target date.

In some embodiments, the model 300 as shown in FIG. 3 may further include a feature fusion network 340.

In some embodiments, taking into account the lag of market influence, the dynamic feature representation vectors $$\chi_{t-n+1}^m, \chi_{t-n+2}^m, \ldots, \chi_{t-1}^m$$

of the fund market of the previous n trading days may be obtained while obtaining the dynamic feature representation vector of the fund market on day t using the method described above, and the fund dynamic features on day t and on the previous n trading days are fused through the feature fusion network 340, such that the dynamic feature representation vector of the fund market on day t after taking into consideration of the lag of market influence is obtained as the first dynamic feature representation vector on day t.

In some embodiments, the feature fusion network 340 may be a recurrent neural network (Gate Recurrent Unit, GRU). The processing of the feature fusion network 340 may be represented by the following equation:

$$\widetilde{\chi_t^m} = GRU(\chi_{t-n+1}^m, \chi_{t-n+2}^m, \ldots, \chi_t^m)$$

where $\widetilde{\chi_t^m}$ denotes the dynamic feature representation vector of the fund market on day t after considering market lag, and n is a positive integer.

In some embodiments, the first dynamic feature representation vector on a first date after considering market lag and the seventh representation vector of the target fund may be input into the second prediction sub-network 324-2 to obtain the fund performance prediction result of the target fund on the target date.

In some embodiments, feature fusion may first be performed on the first dynamic feature representation vector and the seventh representation vector of the target fund to obtain the macro feature of the target fund, and then the macro feature of the target fund is input into the second prediction sub-network 324-2 to obtain the fund performance prediction result of the target fund on the target date. The feature fusion may be represented as:

$$\chi_t^f = \widetilde{\chi_t^m} \cdot e_f^T$$

Where $$\chi_t^f$$

denotes the macro feature of the target fund, and $e_f$ denotes the seventh representation vector of the target fund, and $\widetilde{\chi_t^m}$ denotes the first dynamic feature representation vector.

According to some embodiments, the data processing method may further include: obtaining a second dynamic feature representation vector of the target object on the target date, wherein the second dynamic feature representation vector is determined based on dynamic attribute data of the target object on each second date of at least one second date prior to the target date; and wherein the obtaining, based at least on the seventh representation vector of the target object and the first dynamic feature representation vector corresponding to each first date of the at least one first date, the target indicator prediction value of the target object on the target date comprises: obtaining, based on the seventh representation vector of the target object, the first dynamic feature representation vector on each first date of the at least one first date, and the second dynamic feature representation vector, the target indicator prediction value of the target object on the target date.

Therefore, the dynamic feature information of the target object itself can be further fused into the representation vector of the target object, thereby improving the prediction accuracy of the target indicator of the target object.

In some embodiments, in a fund performance prediction scenario, the dynamic feature information of the target fund itself may be further introduced into the fund performance prediction of the target fund, thereby further improving the accuracy of the fund performance prediction.

In some embodiments, the dynamic feature information of the target fund itself may be determined by the dynamic attribute data of the fund. The dynamic attribute data may include at least one of the cumulative net asset value and the net asset value per unit of the target fund on each of at least one second date prior to the target date.

In some embodiments, the model 300 as shown in FIG. 3 may further include a second feature extraction network 350.

In some embodiments, the dynamic attribute data of the target fund on each of the at least one second date may be input into the second feature extraction network 350 to obtain the second dynamic feature representation vector $$\chi_t^d$$

of the target fund corresponding to the target date.

In some embodiments, the seventh representation vector, the first dynamic feature representation vector on each first date of the at least one first date, and the second dynamic feature representation vector may be input into the second prediction sub-network 324-2 to obtain the fund performance prediction result of the target fund on the target date.

In some embodiments, the second prediction sub-network 324-2 may be a Multi-Layer Perceptron (MLP) network, and the processing of the second prediction sub-network 324-2 may be represented by the following equation:

$$\hat{r_{t+1}} = MLP(Concat[\chi_t^f, \chi_t^d])$$

where $\hat{r_{t+1}}$ is the performance prediction value of the target fund on the target date (day t+1), and $$\chi_t^f$$

is the macro feature of the target fund.

In some embodiments, the information of the plurality of target funds on the plurality of target dates may be obtained at the same time and organized accordingly, and the data may be input into the model simultaneously, so that the performance prediction result of the plurality of target funds on the plurality of target dates is obtained by the model after the process.

According to some embodiments, as shown in FIG. 6, there is provided a model training method, wherein the model comprises a first feature extraction network and a prediction network, the first feature extraction network comprises a first feature extraction sub-network, a first attention sub-network and a first feature fusion sub-network, and the model training method comprises:

Step S601: obtaining an object relationship diagram and sample data, wherein the object relationship diagram comprises a plurality of first nodes corresponding to a plurality of first objects and is used to represent association relationship information among the plurality of first objects, the sample data comprises inherent attribute data and target indicator data of a sample object, and the sample object is one of the plurality of first objects;

Step S602: obtaining, for the sample object of the plurality of first objects, at least one meta-path corresponding to the sample object in the object relationship diagram, wherein each meta-path of the at least one meta-path is a node path for connecting the sample object and an associated object of the sample object in the object relationship diagram, and the sample object determines a plurality of associated paths with a plurality of second objects other than the sample object in the meta-path, respectively;

for each meta-path of the at least one meta-path, performing the following operations:

Step S603: inputting inherent attribute data of the sample object and inherent attribute data of each of the plurality of second objects on the meta-path into the first feature extraction network to obtain a first representation vector of the sample object and a plurality of third representation vectors corresponding to the plurality of second objects output by the first feature extraction network;

Step S604: determining, based on the first representation vector and the plurality of third representation vectors, a plurality of first attention weights of the sample object relative to the plurality of associated paths respectively by using the first attention sub-network; and Step S605: obtaining, based on the first representation vector of the sample object and the plurality of first attention weights, a second representation vector of the sample object that fused the association relationship information represented by the plurality of associated paths on the meta-path by using the first feature fusion sub-network;

Step S606: inputting at least one second representation vector of the sample object corresponding to the at least one meta-path into the prediction network to obtain a target indicator prediction result of the sample object output by the prediction network; and Step S607: adjusting parameters of the model based on the target indicator prediction result and the target indicator data.

Therefore, the model obtained by training using the above method can record association relationship information between each first object (for example, including at least one of an association relationship between funds, a social relationship between fund managers, and a management relationship between a fund manager and a fund) by constructing an object relationship network; meanwhile, for each meta-path related to the target fund, an attention weight is obtained for each associated path existing on the meta-path, and then feature fusion is performed based on the attention weights to obtain a first representation vector, and then the prediction of the target indicator is performed, such that the association relationship information included in each meta-path can be fused into the representation vector of the target object, and the prediction accuracy of the target indicator of the target object can be improved.

According to some embodiments, the plurality of first objects comprise a plurality of managing subjects and a plurality of managed objects, the sample object and each of the plurality of second objects are managed objects, the plurality of associated paths comprise a plurality of association types, and the plurality of association types include at least two of following types: direct association between two managed objects, indirect association between two managed objects based on at least one managing subject, indirect association between two managed objects based on at least one managed object, and indirect association between two managed objects based on at least one managing subject and at least one managed object, and determining, based on the first representation vector and the plurality of third representation vectors, a plurality of first attention weights of the sample object relative to the plurality of associated paths respectively by using the first attention sub-network comprises: performing, for each association type of the plurality of association types, following operations: determining, in the plurality of associated paths, at least one associated path corresponding to the association type and at least one second object corresponding to the at least one associated path; and determining, based on the first representation vector of the sample object and third representation vector corresponding to each of the at least one second object, at least one second attention weight of the sample object relative to the at least one associated path respectively, corresponding to the association type; and determining, based on at least one second attention weight corresponding to each association type of the plurality of association types, the plurality of first attention weights.

According to some embodiments, obtaining, based on the first representation vector of the sample object and the plurality of first attention weights, a second representation vector of the sample object that fused the association relationship information represented by the plurality of associated paths on the meta-path by using the first feature fusion sub-network comprises: obtaining, for each association type of the plurality of association types, a fourth representation vector corresponding to the association type based on the first representation vector of the sample object and at least one second attention weight corresponding to the association type of the plurality of first attention weights; and concatenating the plurality of fourth representation vectors corresponding to the plurality of association types to obtain the second representation vector.

According to some embodiments, the at least one meta-path is plural, the prediction network comprises a second feature fusion sub-network, a second attention sub-network, a third feature fusion sub-network, and a first prediction sub-network, and inputting at least one second representation vector of the sample object corresponding to the at least one meta-path into the prediction network to obtain a target indicator prediction result of the sample object output by the prediction network comprises: inputting, for each meta-path of the at least one meta-path, second representation vector corresponding to each managed object on the meta-path into the second feature fusion sub-network to obtain a path representation vector of the meta-path output by the second feature fusion sub-network; determining, based on the path representation vector corresponding to each of the at least one meta-path, at least one third attention weight corresponding to the at least one meta-path by using the second attention sub-network; obtaining, based on the at least one second representation vector and the at least one third attention weight, a fifth representation vector of the sample object by using the third feature fusion sub-network; and inputting at least the fifth representation vector into the first prediction sub-network to obtain the target indicator prediction result output by the first prediction sub-network.

According to some embodiments, each managed object of the plurality of managed objects is composed of a plurality of sub-objects in proportion, the model further comprises a tensor decomposition network, the first prediction sub-network comprises a fourth feature fusion sub-network and a second prediction sub-network, and the method further comprises: obtaining tensor data corresponding to the object relationship diagram, wherein the tensor data is used to record proportion data of each sub-object corresponding to each managed object in the object relationship diagram; and inputting the tensor data into the decomposition network to obtain a sixth representation vector corresponding to each managed object in the object relationship diagram output by the decomposition network, wherein the sixth representation vector is used to represent a component feature of corresponding managed object; and wherein the inputting at least the fifth representation vector into the first prediction sub-network to obtain the target indicator prediction result output by the first prediction sub-network comprises: inputting the fifth representation vector and the sixth representation vector of the sample object into the fourth feature fusion sub-network to obtain a seventh representation vector of the sample object output by the fourth feature fusion sub-network; and inputting at least the seventh representation vector into the second prediction sub-network to obtain the target indicator prediction result output by the second prediction sub-network.

According to some embodiments, the target indicator data comprises a target indicator value of the sample object on a sample date, the target indicator prediction result comprises a target indicator prediction value of the sample object on the sample date, the model further comprises a feature fusion network, and the method further comprises: performing, for each first date of at least one first date prior to the sample date, following operations: determining, based on the target dynamic attribute data on the first date, a preset number of third objects in the plurality of managed objects, wherein difference between the dynamic attribute data of the third object and the target dynamic attribute data is less than difference between the target dynamic attribute data and the dynamic attribute data of other managed object other than the third object in the plurality of managed objects; and inputting seventh representation vector corresponding to each third object of the preset number of third objects into the feature fusion network to obtain a first dynamic feature representation vector corresponding to the first date output by the feature fusion network; and wherein the inputting at least the seventh representation vector into the second prediction sub-network to obtain the target indicator prediction result output by the second prediction sub-network comprises: inputting at least the seventh representation vector of the sample object and the first dynamic feature representation vector corresponding to each first date of the at least one first date into the second prediction sub-network to obtain the target indicator prediction value of the sample object on the sample date output by the second prediction sub-network.

According to some embodiments, the sample data further comprises dynamic attribute data of the sample object on each second date of at least one second date prior to the sample date, the model further comprises a second feature extraction network, and the method further comprises: inputting the dynamic attribute data of the sample object on each second date of the at least one second date prior to the sample date into the second feature extraction network to obtain a second dynamic feature representation vector of the sample object on the sample date; and wherein the inputting at least the seventh representation vector of the sample object and the first dynamic feature representation vector corresponding to each first date of the at least one first date into the second prediction sub-network to obtain the target indicator prediction value of the sample object on the sample date output by the second prediction sub-network comprises: inputting at least the seventh representation vector of the sample object, the first dynamic feature representation vector on each first date of the at least one first date, and the second dynamic feature representation vector into the second prediction sub-network to obtain the target indicator prediction value of the sample object on the sample date output by the second prediction sub-network.

In some embodiments, the model may be the model 300 shown in FIG. 3.

In some embodiments, the loss function $\mathcal{L}$ of the model may be represented as:

$$\mathcal{L} = \mathcal{L}_{\mathcal{R}} + \lambda_T \mathcal{L}_T + \lambda_\Theta \|\Theta\|^2$$

$$\mathcal{L}_{\mathcal{R}} = \|\widehat{r_{t+1}} - r_{t+1}\|^2$$

Where $\mathcal{L}_{\mathcal{R}}$ denotes the difference between the predicted value and the real value of the target indicator of at least one sample object on at least one sample date; $\mathcal{L}_T$ is the loss of the tensor decomposition network; $\Theta$ is all the parameters of the model, and $\lambda_T$ and $\lambda_\Theta$ are weighting coefficients.

Figure 7:
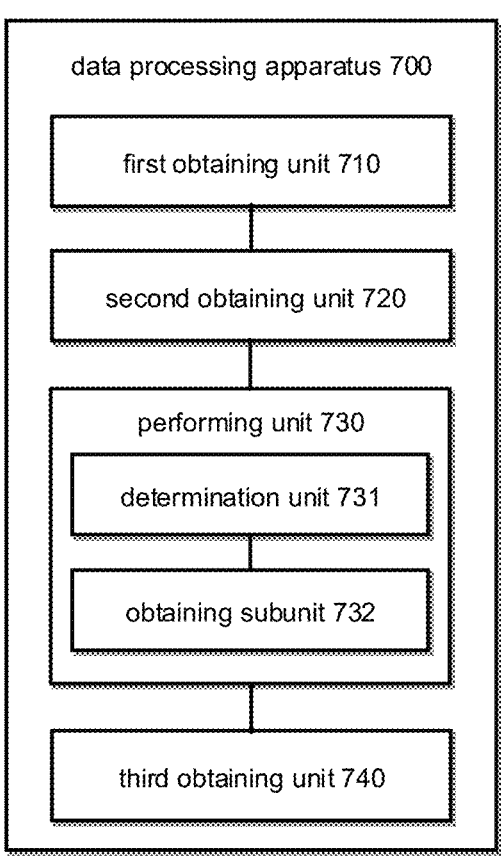
FIG. 7 illustrates a structural block diagram of a data processing apparatus according to some embodiments of the present disclosure.

According to some embodiments, as shown in FIG. 7, there is provided a data processing apparatus 700, comprising:

a first obtaining unit 710 configured to obtain an object relationship diagram, wherein the object relationship diagram comprises a plurality of first nodes corresponding to a plurality of first objects and is used to represent association relationship information among the plurality of first objects;

a second obtaining unit 720 configured to obtain, for a target object of the plurality of first objects, at least one meta-path corresponding to the target object in the object relationship diagram, wherein each meta-path of the at least one meta-path is a node path for connecting the target object and an associated object of the target object in the object relationship diagram, and the target object determines a plurality of associated paths with a plurality of second objects other than the target object in the meta-path, respectively;

a performing unit 730 configured to performing, for each meta-path of the at least one meta-path, following operations, and the performing unit 730 comprises:

a determination unit 731 configured to determine, based on inherent attribute data of the target object and inherent attribute data of each of the plurality of second objects on the meta-path, a plurality of first attention weights of the target object relative to the plurality of associated paths respectively; and an obtaining subunit 732 configured to obtain, based on a first representation vector of the target object and the plurality of first attention weights, a second representation vector of the target object that fused association relationship information represented by the plurality of associated paths on the meta-path, wherein the first representation vector is determined based on the inherent attribute data of the target object; and a third obtaining unit 740 configured to obtain, based at least on at least one second representation vector of the target object corresponding to the at least one meta-path, a target indicator prediction result of the target object.

Therein, the operation of each of the units 710-740 and subunits 731-732 of the data processing apparatus 700 is similar to the operation of steps S201-S205 in the data processing method described above, respectively, and will not be repeated herein.

Figure 8:
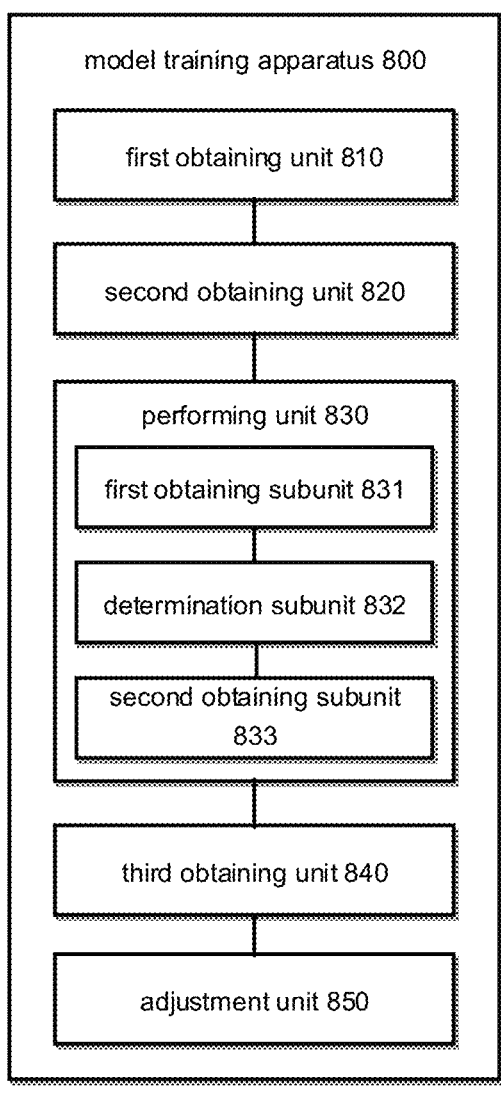
FIG. 8 illustrates a structural block diagram of a model training apparatus according to some embodiments of the present disclosure.

According to some embodiments, as shown in FIG. 8, there is provided a model training apparatus 800, the model comprises a first feature extraction network and a prediction network, the first feature extraction network comprises a first feature extraction sub-network, a first attention sub-network and a first feature fusion sub-network, and the model training apparatus comprises:

a first obtaining unit 810 configured to obtain an object relationship diagram and sample data, wherein the object relationship diagram comprises a plurality of first nodes corresponding to a plurality of first objects and is used to represent association relationship information among the plurality of first objects, the sample data comprises inherent attribute data and target indicator data of a sample object, and the sample object is one of the plurality of first objects;

a second obtaining unit 820 configured to obtain, for the sample object of the plurality of first objects, at least one meta-path corresponding to the sample object in the object relationship diagram, wherein each meta-path of the at least one meta-path is a node path for connecting the sample object and an associated object of the sample object in the object relationship diagram, and the sample object determines a plurality of associated paths with a plurality of second objects other than the sample object in the meta-path, respectively;

a performing unit 830 configured to perform, for each meta-path of the at least one meta-path, following operations, the performing unit 830 comprises:

a first obtaining subunit 831 configured to inherent attribute data of the sample object and inherent attribute data of each of the plurality of second objects on the meta-path into the first feature extraction network to obtain a first representation vector of the sample object and a plurality of third representation vectors corresponding to the plurality of second objects output by the first feature extraction network; and a determination subunit 832 configured to determine, based on the first representation vector and the plurality of third representation vectors, a plurality of first attention weights of the sample object relative to the plurality of associated paths respectively by using the first attention sub-network; and a second obtaining subunit 833 configured to obtain, based on the first representation vector of the sample object and the plurality of first attention weights, a second representation vector of the sample object that fused the association relationship information represented by the plurality of associated paths on the meta-path by using the first feature fusion sub-network;

a third obtaining unit 840 configured to input at least one second representation vector of the sample object corresponding to the at least one meta-path into the prediction network to obtain a target indicator prediction result of the sample object output by the prediction network; and an adjustment unit 850 configured to adjust parameters of the model based on the target indicator prediction result and the target indicator data.

Therein, the operation of each of the units 810-850 and subunits 831-833 of the model training apparatus 800 is similar to the operation of steps S601-S607 in the model training method described above, respectively, and will not be repeated herein.

According to embodiments of the present disclosure, there is also provided an electronic device, a readable storage medium, and a computer program product.

Figure 9:
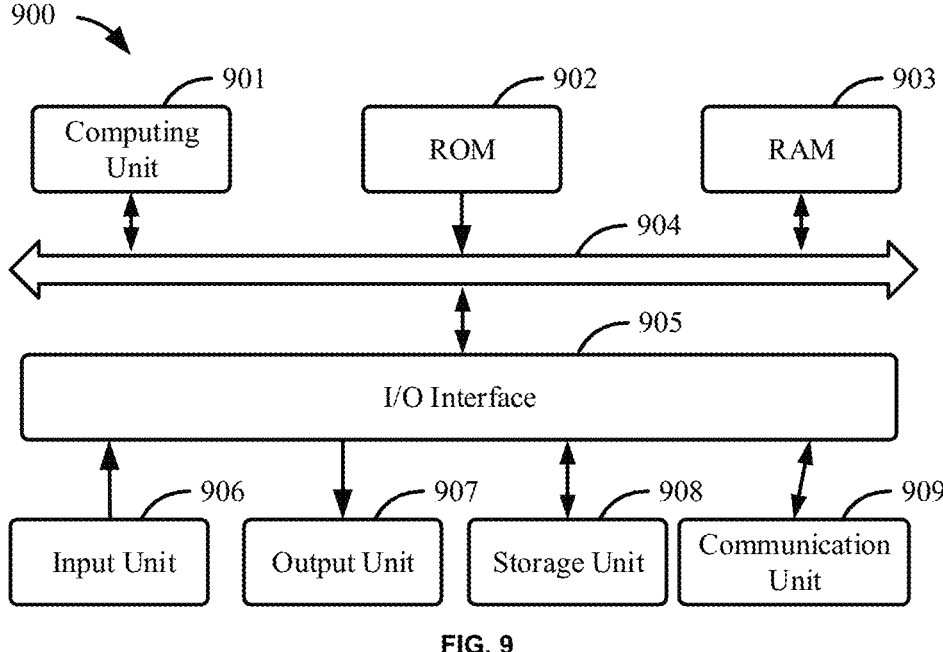
FIG. 9 illustrates a structural block diagram of an example electronic device that can be used to implement embodiments of the present disclosure.

Referring to FIG. 9, a structural block diagram of an electronic device 900 that may be a server or client of the present disclosure is now described, which is an example of a hardware device that may be applied to aspects of the present disclosure. Electronic devices are intended to represent various forms of digital electronic computer devices, such as laptop computers, desktop computers, workstations, personal digital assistants, servers, blade servers, mainframe computers, and other suitable computers. The electronic devices may also represent various forms of mobile devices, such as personal digital processing, cellular telephones, smart phones, wearable devices, and other similar computing devices. The components shown herein, their connections and relationships, and their functions are merely as examples, and are not intended to limit the implementations of the disclosure described and/or claimed herein.

As shown in FIG. 9, the electronic device 900 includes a computing unit 901, which may perform various appropriate actions and processing according to a computer program stored in a read-only memory (ROM) 902 or a computer program loaded into a random access memory (RAM) 903 from a storage unit 908. In the RAM 903, various programs and data required by the operation of the electronic device 900 may also be stored. The computing unit 901, the ROM 902, and the RAM 903 are connected to each other through a bus 904. Input/output (I/O) interface 905 is also connected to the bus 904.

A plurality of components in the electronic device 900 are connected to a I/O interface 905, including: an input unit 906, an output unit 907, a storage unit 908, and a communication unit 909. The input unit 906 may be any type of device capable of inputting information to the electronic device 900, the input unit 906 may receive input digital or character information and generate a key signal input related to user setting and/or function control of the electronic device, and may include, but is not limited to, a mouse, a keyboard, a touch screen, a track pad, a trackball, a joystick, a microphone, and/or a remote control. The output unit 907 may be any type of device capable of presenting information, and may include, but are not limited to, a display, a speaker, a video/audio output terminal, a vibrator, and/or a printer. The storage unit 908 may include, but is not limited to, a magnetic disk and an optical disk. The communication unit 909 allows the electronic device 900 to exchange information/data with other devices over a computer network, such as the Internet, and/or various telecommunication networks, and may include, but is not limited to, a modem, a network card, an infrared communication device, a wireless communication transceiver and/or a chipset, such as a Bluetooth device, a 802.11 device, a WiFi device, a WiMAX device, a cellular communication device, and/or the like.

The computing unit 901 may be a variety of general and/or special purpose processing components with processing and computing capabilities. Some examples of the computing unit 901 include, but are not limited to, a central processing unit (CPU), a graphic processing unit (GPU), various dedicated artificial intelligence (AI) computing chips, various computing units running machine learning model algorithms, a digital signal processor (DSP), and any suitable processor, controller, microcontroller, etc. The computing unit 901 performs the various methods and processes described above, such as the data processing method and the model training method described above. For example, in some embodiments, the data processing method and the model training method described above may be implemented as a computer software program tangibly contained in a machine-readable medium, such as the storage unit 908. In some embodiments, part or all of the computer program may be loaded and/or installed onto the electronic device 900 via the ROM 902 and/or the communication unit 909. When the computer program is loaded to the RAM 903 and executed by the computing unit 901, one or more steps of the data processing method and the model training method described above may be performed. Alternatively, in other embodiments, the computing unit 901 may be configured to perform the data processing method and the model training method described above by any other suitable means (e.g., with the aid of firmware).

Various embodiments of the systems and techniques described above herein may be implemented in a digital electronic circuit system, an integrated circuit system, a field programmable gate array (FPGA), an application specific integrated circuit (ASIC), a dedicated standard product (ASSP), a system of system on a chip system (SoC), a complex programmable logic device (CPLD), computer hardware, firmware, software, and/or combinations thereof. These various embodiments may include: implementation in one or more computer programs that may be executed and/or interpreted on a programmable system including at least one programmable processor, where the programmable processor may be a dedicated or universal programmable processor that may receive data and instructions from a storage system, at least one input device, and at least one output device, and transmit data and instructions to the storage system, the at least one input device, and the at least one output device.

The program code for implementing the method of the present disclosure may be written in any combination of one or more programming languages. These program code may be provided to a processor or controller of a general-purpose computer, a special purpose computer, or other programmable data processing device such that the program code, when executed by the processor or controller, causes the functions/operations specified in the flowchart and/or block diagram to be implemented. The program code may be executed entirely on the machine, partly on the machine, partly on the machine as a stand-alone software package and partly on the remote machine or entirely on the remote machine or server.

In the context of the present disclosure, a machine-readable medium may be a tangible medium, which may contain or store a program for use by or in connection with an instruction execution system, device, or device. The machine-readable medium may be a machine-readable signal medium or a machine-readable storage medium. The machine-readable medium may include, but is not limited to, electronic, magnetic, optical, electromagnetic, infrared, or semiconductor systems, apparatus, or devices, or any suitable combination of the foregoing. More specific examples of a machine-readable storage media may include an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the foregoing.

To provide interaction with a user, the systems and techniques described herein may be implemented on a computer having: a display device (e.g., a CRT (cathode ray tube) or an LCD (liquid crystal display) monitor) for displaying information to a user; and a keyboard and pointing device (e.g., a mouse or trackball) by which a user may provide input to the computer. Other types of devices may also be used to provide interaction with a user; for example, the feedback provided to the user may be any form of perception feedback (e.g., visual feedback, auditory feedback, or tactile feedback); and the input from the user may be received in any form, including acoustic input, voice input, or haptic input.

The systems and techniques described herein may be implemented in a computing system including a back-end component (e.g., as a data server), or a computing system including a middleware component (e.g., an application server), or a computing system including a front-end component (e.g., a user computer with a graphic user interface or a web browser, the user may interact with implementations of the systems and techniques described herein through the graphic user interface or the web browser), or in a computing system including any combination of such back-end components, middleware components, or front-end components. The components of the system may be interconnected by digital data communication (e.g., a communications network) in any form or medium. Examples of communication networks include a local area network (LAN), a wide area network (WAN), the Internet, and a blockchain network.

The computer system may include a client and a server. Clients and servers are generally remote from each other and typically interact through a communication network. The relationship between clients and servers is generated by computer programs running on respective computers and having a client-server relationship to each other. The server may be a cloud server, or may be a server of a distributed system, or a server incorporating a blockchain.

It should be understood that the various forms of processes shown above may be used, and the steps may be reordered, added, or deleted. For example, the steps described in the present disclosure may be performed in parallel or sequentially or in a different order, as long as the results expected by the technical solutions disclosed in the present disclosure can be achieved, and no limitation is made herein.

Although embodiments or examples of the present disclosure have been described with reference to the accompanying drawings, it should be understood that the foregoing methods, systems, and devices are merely embodiments or examples, and the scope of the present disclosure is not limited by these embodiments or examples, but is only defined by the authorized claims and their equivalents. Various elements in the embodiments or examples may be omitted or may be replaced by equivalent elements thereof. Further, the steps may be performed by a different order than described in this disclosure. Further, various elements in the embodiments or examples may be combined in various ways. Importantly, with the evolution of the technology, many elements described herein may be replaced by equivalent elements appearing after the present disclosure.

The invention claimed is:

1. A data processing method, comprising:
obtaining an object relationship diagram, wherein the object relationship diagram comprises a plurality of first nodes corresponding to a plurality of first objects and is used to represent association relationship information among the plurality of first objects;
obtaining, for a target object of the plurality of first objects, at least one meta-path corresponding to the target object in the object relationship diagram, wherein each meta-path of the at least one meta-path is a node path for connecting the target object and an associated object of the target object in the object relationship diagram, and wherein the target object determines a plurality of associated paths with a plurality of second objects other than the target object in the meta-path, respectively;
performing, for each meta-path of the at least one meta-path, following operations:

determining, based on inherent attribute data unrelated to node paths of the target object and inherent attribute data unrelated to node paths of each of the plurality of second objects on the meta-path, a plurality of first attention weights of the target object relative to the plurality of associated paths respectively, the determining the plurality of first attention weights comprising:
inputting the inherent attribute data unrelated to node paths of the target object into a feature extraction network to obtain a first representation vector of the target object output by the feature extraction network;
inputting the inherent attribute data unrelated to node paths of each of the plurality of second objects into the feature extraction network, respectively, to obtain a third representation vector of each of the second objects output by the feature extraction network;
splicing, for each associated path on the meta-path, the first representation vector of the target object and the third representation vector of a second object corresponding to the associated path, to obtain an associated path representation vector of the associated path; and
determining the plurality of first attention weights by processing a plurality of associated path representation vectors corresponding to the plurality of associated paths on the meta-path based on an attention mechanism; and
obtaining, based on a first representation vector of the target object and the plurality of first attention weights, a second representation vector of the target object that fused association relationship information represented by the plurality of associated paths on the meta-path; and
obtaining, based at least on at least one second representation vector of the target object corresponding to the at least one meta-path, a target indicator prediction result of the target object.

2. The method according to claim 1, wherein the plurality of first objects include a plurality of managing subjects and a plurality of managed objects, the target object and each of the plurality of second objects being managed objects, the plurality of associated paths including a plurality of association types, and wherein the plurality of association types include at least two of following association types: direct association between two managed objects, indirect association between two managed objects based on at least one managing subject, indirect association between two managed objects based on at least one managed object, and indirect association between two managed objects based on at least one managing subject and at least one managed object, and wherein:
the determining the plurality of first attention weights by processing the plurality of associated path representation vectors corresponding to the plurality of associated paths on the meta-path based on the attention mechanism comprises:
performing, for each association type of the plurality of association types, following operations:
determining, in the plurality of associated paths, at least one associated path corresponding to the association type; and
determining, by processing at least one representation vector corresponding to the at least one associated path based on the attention mechanism, at least one second attention weight of the target object relative to the at least one associated path respectively, corresponding to the association type; and determining, based on at least one second attention weight corresponding to each association type of the plurality of association types, the plurality of first attention weights.

3. The method according to claim 2, wherein the obtaining, based on the first representation vector of the target object and the plurality of first attention weights, the second representation vector of the target object that fused association relationship information represented by the plurality of associated paths on the meta-path comprises:

obtaining, for each association type of the plurality of association types, a fourth representation vector corresponding to the association type based on the first representation vector of the target object and at least one second attention weight corresponding to the association type of the plurality of first attention weights; and concatenating a plurality of fourth representation vectors corresponding to the plurality of association types to obtain the second representation vector.

4. The method according to claim 3, wherein the at least one meta-path is plural, and wherein the obtaining, based at least on the at least one second representation vector of the target object corresponding to the at least one meta-path, the target indicator prediction result of the target object comprises:

determining, for each meta-path of the at least one meta-path, a path representation vector of the meta-path based on second representation vector corresponding to each managed object on the meta-path;

determining, based on the path representation vector corresponding to each of the at least one meta-path, at least one third attention weight corresponding to the at least one meta-path;

obtaining, based on the at least one second representation vector and the at least one third attention weight, a fifth representation vector of the target object; and obtaining, based at least on the fifth representation vector, the target indicator prediction result.

5. The method according to claim 4, wherein each managed object of the plurality of managed objects is composed of a plurality of sub-objects in proportion, and wherein the method further comprises:

obtaining tensor data corresponding to the object relationship diagram, wherein the tensor data is used to record proportion data of each sub-object corresponding to each managed object in the object relationship diagram; and performing tensor decomposition on the tensor data to obtain a sixth representation vector corresponding to each managed object in the object relationship diagram, wherein the sixth representation vector is used to represent a component feature of a corresponding managed object; and wherein the obtaining, based at least on the fifth representation vector, the target indicator prediction result comprises:

performing feature fusion on the fifth representation vector and the sixth representation vector of the target object to obtain a seventh representation vector of the target object; and obtaining, based at least on the seventh representation vector of the target object, the target indicator prediction result.

6. The method according to the claim 5, wherein the target indicator prediction result comprises a target indicator prediction value of the target object on a target date, and wherein the method further comprises:

performing, for each first date of at least one first date prior to the target date, following operations:

determining, based on target dynamic attribute data on the first date, a preset number of third objects in the plurality of managed objects, wherein difference between the dynamic attribute data of the third object and the target dynamic attribute data is less than difference between the target dynamic attribute data and the dynamic attribute data of other managed object other than the third object in the plurality of managed objects; and performing feature fusion on a seventh representation vector corresponding to each third object of the preset number of third objects to obtain a first dynamic feature representation vector corresponding to the first date; and wherein the obtaining, based at least on the seventh representation vector of the target object, the target indicator prediction result comprises:

obtaining, based at least on the seventh representation vector of the target object and the first dynamic feature representation vector corresponding to each first date of the at least one first date, the target indicator prediction value of the target object on the target date.

7. The method according to the claim 6, further comprising:

obtaining a second dynamic feature representation vector of the target object on the target date, wherein the second dynamic feature representation vector is determined based on dynamic attribute data of the target object on each second date of at least one second date prior to the target date; and wherein the obtaining, based at least on the seventh representation vector of the target object and the first dynamic feature representation vector corresponding to each first date of the at least one first date, the target indicator prediction value of the target object on the target date comprises:

obtaining, based on the seventh representation vector of the target object, the first dynamic feature representation vector on each first date of the at least one first date, and the second dynamic feature representation vector, the target indicator prediction value of the target object on the target date.

8. The method according to the claim 1, wherein the target indicator prediction result is obtained by using a model, wherein the model comprises a first feature extraction network and a prediction network, the first feature extraction network comprises a first feature extraction sub-network, a first attention sub-network and a first feature fusion sub-network, and the model is trained based on following first operations:

obtaining a sample object relationship diagram and sample data, wherein the sample object relationship diagram comprises a plurality of first sample nodes corresponding to a plurality of first sample objects and is used to represent association relationship information among the plurality of first sample objects, and wherein the sample data comprises inherent attribute data unrelated to node paths and target indicator data of a sample object, and the sample object is one of the plurality of first sample objects;

obtaining, for the sample object of the plurality of first sample objects, at least one sample meta-path corresponding to the sample object in the sample object relationship diagram, wherein each sample meta-path of the at least one sample meta-path is a node path for connecting the sample object and an associated object of the sample object in the sample object relationship diagram, and wherein the sample object determines a plurality of associated sample paths with a plurality of second sample objects other than the sample object in the sample meta-path, respectively;

performing, for each sample meta-path of the at least one sample meta-path, following operations:

inputting inherent attribute data unrelated to node paths of the sample object and inherent attribute data unrelated to node paths of each of the plurality of second sample objects on the sample meta-path into the first feature extraction network to obtain a first vector of the sample object and a plurality of third vectors corresponding to the plurality of second sample objects output by the first feature extraction network;

determining, based on the first vector and the plurality of third vectors, a plurality of fourth attention weights of the sample object relative to the plurality of associated sample paths respectively by using the first attention sub-network; and obtaining, based on the first vector of the sample object and the plurality of fourth attention weights, a second vector of the sample object that fused association relationship information represented by the plurality of associated sample paths on the sample meta-path by using the first feature fusion sub-network;

inputting at least one second vector of the sample object corresponding to the at least one sample meta-path into the prediction network to obtain a sample indicator prediction result of the sample object output by the prediction network; and adjusting parameters of the model based on the sample indicator prediction result and the target indicator data.

9. The method according to claim 8, wherein the plurality of first sample objects comprise a plurality of managing subjects and a plurality of managed objects, the target object and each of the plurality of second sample objects being managed objects, the plurality of associated sample paths comprising a plurality of sample association types, and wherein the plurality of sample association types include at least two of following types: direct association between two managed objects, indirect association between two managed objects based on at least one managing subject, indirect association between two managed objects based on at least one managed object, and indirect association between two managed objects based on at least one managing subject and at least one managed object, and wherein the determining, based on the first vector and the plurality of third vectors, the plurality of forth attention weights of the sample object relative to the plurality of associated sample paths respectively by using the first attention sub-network comprises:

performing, for each sample association type of the plurality of sample association types, following operations:

determining, in the plurality of associated sample paths, at least one associated sample path corresponding to the sample association type and at least one second sample object corresponding to the at least one associated sample path; and determining, based on the first vector of the sample object and third vector corresponding to each of the at least one second sample object, at least one fifth attention weight of the sample object relative to the at least one associated sample path respectively, corresponding to the sample association type; and determining, based on at least one fifth attention weight corresponding to each sample association type of the plurality of sample association types, the plurality of forth attention weights.

10. The method according to claim 9, wherein obtaining, based on the first vector of the sample object and the plurality of forth attention weights, the second vector of the target object that fused the association relationship information represented by the plurality of associated sample paths on the sample meta-path by using the first feature fusion sub-network comprises:

obtaining, for each sample association type of the plurality of sample association types, a fourth vector corresponding to the sample association type based on the first vector of the target object and at least one fifth attention weight corresponding to the sample association type of the plurality of forth attention weights; and concatenating the plurality of fourth vectors corresponding to the plurality of sample association types to obtain the second vector.

11. The method according to claim 10, wherein the at least one sample meta-path is plural, wherein the prediction network comprises a second feature fusion sub-network, a second attention sub-network, a third feature fusion sub-network, and a first prediction sub-network, and wherein inputting at least one second vector of the sample object corresponding to the at least one sample meta-path into the prediction network to obtain a sample indicator prediction result of the sample object output by the prediction network comprises:

inputting, for each sample meta-path of the at least one sample meta-path, second vector corresponding to each managed object on the sample meta-path into the second feature fusion sub-network to obtain a path vector of the sample meta-path output by the second feature fusion sub-network;

determining, based on the path vector corresponding to each of the at least one sample meta-path, at least one sixth attention weight corresponding to the at least one sample meta-path by using the second attention sub-network;

obtaining, based on the at least one second vector and the at least one sixth attention weight, a fifth vector of the sample object by using the third feature fusion sub-network; and inputting at least the fifth vector into the first prediction sub-network to obtain the sample indicator prediction result output by the first prediction sub-network.

12. The method according to claim 11, wherein each managed object of the plurality of managed objects in the plurality of first sample objects is composed of a plurality of sub-objects in proportion, wherein the model further comprises a tensor decomposition network, wherein the first prediction sub-network comprises a fourth feature fusion sub-network and a second prediction sub-network, and wherein the first operations further comprises:

obtaining sample tensor data corresponding to the sample object relationship diagram, wherein the sample tensor data is used to record proportion data of each sub-object corresponding to each managed object in the sample object relationship diagram; and inputting the sample tensor data into the decomposition network to obtain a sixth vector corresponding to each managed object in the sample object relationship diagram output by the decomposition network, wherein the sixth vector is used to represent a component feature of a corresponding managed object; and wherein the inputting at least the fifth vector into the first prediction sub-network to obtain the sample indicator prediction result output by the first prediction sub-network comprises:

inputting the fifth vector and the sixth vector of the sample object into the fourth feature fusion sub-network to obtain a seventh vector of the sample object output by the fourth feature fusion sub-network; and inputting at least the seventh vector of the sample object into the second prediction sub-network to obtain the sample indicator prediction result output by the second prediction sub-network.

13. The method according to the claim 12, wherein the target indicator data comprises a target indicator value of the sample object on a sample date, wherein the sample indicator prediction result comprises a sample indicator prediction value of the sample object on the sample date, wherein the model further comprises a feature fusion network, and wherein the first operations further comprises:

performing, for each first sample date of at least one first sample date prior to the sample date, following operations:

determining, based on sample dynamic attribute data on the first sample date, a preset number of third sample objects in the plurality of managed objects in the plurality of first sample objects, wherein difference between the dynamic attribute data of the third sample object and the sample dynamic attribute data is less than difference between the sample dynamic attribute data and the dynamic attribute data of other managed object other than the third sample object in the plurality of managed objects in the plurality of first sample objects; and inputting a seventh vector corresponding to each third sample object of the preset number of third sample objects into the feature fusion network to obtain a first dynamic feature vector corresponding to the first sample date output by the feature fusion network; and wherein the inputting at least the seventh vector of the sample object into the second prediction sub-network to obtain the sample indicator prediction result output by the second prediction sub-network comprises:

inputting at least the seventh vector of the sample object and the first dynamic feature vector corresponding to each first sample date of the at least one first sample date into the second prediction sub-network to obtain the sample indicator prediction value of the sample object on the sample date output by the second prediction sub-network.

14. The method according to the claim 13, wherein the sample data further comprises dynamic attribute data of the sample object on each second sample date of at least one second sample date prior to the sample date, the model further comprises a second feature extraction network, and the first operations further comprises:

inputting the dynamic attribute data of the sample object on each second sample date of the at least one second sample date prior to the sample date into the second feature extraction network to obtain a second dynamic feature vector of the sample object on the sample date; and wherein the inputting at least the seventh vector of the sample object and the first dynamic feature vector corresponding to each first sample date of the at least one first sample date into the second prediction sub-network to obtain the sample indicator prediction value of the sample object on the sample date output by the second prediction sub-network comprises:

inputting at least the seventh vector of the sample object, the first dynamic feature vector on each first sample date of the at least one first sample date, and the second dynamic feature vector into the second prediction sub-network to obtain the sample indicator prediction value of the sample object on the sample date output by the second prediction sub-network.

15. An electronic device, comprising:

one or more processors; and a memory storing one or more programs configured to be executed by the one or more processors, the one or more programs comprising instructions for:

obtaining an object relationship diagram, wherein the object relationship diagram comprises a plurality of first nodes corresponding to a plurality of first objects and is used to represent association relationship information among the plurality of first objects;

obtaining, for a target object of the plurality of first objects, at least one meta-path corresponding to the target object in the object relationship diagram, wherein each meta-path of the at least one meta-path is a node path for connecting the target object and an associated object of the target object in the object relationship diagram, and the target object determines a plurality of associated paths with a plurality of second objects other than the target object in the meta-path, respectively;

performing, for each meta-path of the at least one meta-path, following operations:

determining, based on inherent attribute data unrelated to node paths of the target object and inherent attribute data unrelated to node paths of each of the plurality of second objects on the meta-path, a plurality of first attention weights of the target object relative to the plurality of associated paths respectively, the determining the plurality of first attention weights comprising:

inputting the inherent attribute data unrelated to node paths of the target object into a feature extraction network to obtain a first representation vector of the target object output by the feature extraction network;

inputting the inherent attribute data unrelated to node paths of each of the plurality of second objects into the feature extraction network, respectively, to obtain a third representation vector of each of the second objects output by the feature extraction network;

splicing, for each associated path on the meta-path, the first representation vector of the target object and the third representation vector of a second object corresponding to the associated path, to obtain an associated path representation vector of the associated path; and determining the plurality of first attention weights by processing a plurality of associated path representation vectors corresponding to the plurality of associated paths on the meta-path based on an attention mechanism; and obtaining, based on a first representation vector of the target object and the plurality of first attention weights, a second representation vector of the target object that fused association relationship information represented by the plurality of associated paths on the meta-path; and obtaining, based at least on at least one second representation vector of the target object corresponding to the at least one meta-path, a target indicator prediction result of the target object.

16. The electronic device according to claim 15, wherein the plurality of first objects include a plurality of managing subjects and a plurality of managed objects, the target object and each of the plurality of second objects are managed objects, the plurality of associated paths include a plurality of association types, and the plurality of association types include at least two of following association types: direct association between two managed objects, indirect association between two managed objects based on at least one managing subject, indirect association between two managed objects based on at least one managed object, and indirect association between two managed objects based on at least one managing subject and at least one managed object, and wherein the determining the plurality of first attention weights by processing the plurality of associated path representation vectors corresponding to the plurality of associated paths on the meta-path based on the attention mechanism comprises:

performing, for each association type of the plurality of association types, following operations:

determining, in the plurality of associated paths, at least one associated path corresponding to the association type; and determining, by processing at least one representation vector corresponding to the at least one associated path based on the attention mechanism, at least one second attention weight of the target object relative to the at least one associated path respectively, corresponding to the association type; and determining, based on at least one second attention weight corresponding to each association type of the plurality of association types, the plurality of first attention weights.

17. The electronic device according to claim 16, wherein the obtaining, based on the first representation vector of the target object and the plurality of first attention weights, the second representation vector of the target object that fused association relationship information represented by the plurality of associated paths on the meta-path comprises:

obtaining, for each association type of the plurality of association types, a fourth representation vector corresponding to the association type based on the first representation vector of the target object and at least one second attention weight corresponding to the association type of the plurality of first attention weights; and concatenating a plurality of fourth representation vectors corresponding to the plurality of association types to obtain the second representation vector.

18. A non-transitory computer-readable storage medium, storing one or more programs comprising instructions that, when executed by one or more processors of a computing device, cause the computing device to perform operations comprising:

obtaining an object relationship diagram, wherein the object relationship diagram comprises a plurality of first nodes corresponding to a plurality of first objects and is used to represent association relationship information among the plurality of first objects;

obtaining, for a target object of the plurality of first objects, at least one meta-path corresponding to the target object in the object relationship diagram, wherein each meta-path of the at least one meta-path is a node path for connecting the target object and an associated object of the target object in the object relationship diagram, and the target object determines a plurality of associated paths with a plurality of second objects other than the target object in the meta-path, respectively;

performing, for each meta-path of the at least one meta-path, following operations:

determining, based on inherent attribute data unrelated to node paths of the target object and inherent attribute data unrelated to node paths of each of the plurality of second objects on the meta-path, a plurality of first attention weights of the target object relative to the plurality of associated paths respectively, the determining the plurality of first attention weights comprising:

inputting the inherent attribute data unrelated to node paths of the target object into a feature extraction network to obtain a first representation vector of the target object output by the feature extraction network;

inputting the inherent attribute data unrelated to node paths of each of the plurality of second objects into the feature extraction network, respectively, to obtain a third representation vector of each of the second objects output by the feature extraction network;

splicing, for each associated path on the meta-path, the first representation vector of the target object and the third representation vector of a second object corresponding to the associated path, to obtain an associated path representation vector of the associated path; and determining the plurality of first attention weights by processing a plurality of associated path representation vectors corresponding to the plurality of associated paths on the meta-path based on an attention mechanism; and obtaining, based on a first representation vector of the target object and the plurality of first attention weights, a second representation vector of the target object that fused association relationship information represented by the plurality of associated paths on the meta-path; and obtaining, based at least on at least one second representation vector of the target object corresponding to the at least one meta-path, a target indicator prediction result of the target object.

19. The non-transitory computer-readable storage medium according to claim 18, wherein the plurality of first objects include a plurality of managing subjects and a plurality of managed objects, the target object and each of the plurality of second objects are managed objects, the plurality of associated paths include a plurality of association types, and the plurality of association types include at least two of following association types: direct association between two managed objects, indirect association between two managed objects based on at least one managing subject, indirect association between two managed objects based on at least one managed object, and indirect association between two managed objects based on at least one managing subject and at least one managed object, and wherein the determining the plurality of first attention weights by processing the plurality of associated path representation vectors corresponding to the plurality of associated paths on the meta-path based on the attention mechanism comprises:

performing, for each association type of the plurality of association types, following operations:

determining, in the plurality of associated paths, at least one associated path corresponding to the association type; and determining, by processing at least one representation vector corresponding to the at least one associated path based on the attention mechanism, at least one second attention weight of the target object relative to the at least one associated path respectively, corresponding to the association type; and determining, based on at least one second attention weight corresponding to each association type of the plurality of association types, the plurality of first attention weights.

20. The non-transitory computer-readable storage medium according to claim 19, wherein the obtaining, based on the first representation vector of the target object and the plurality of first attention weights, the second representation vector of the target object that fused association relationship information represented by the plurality of associated paths on the meta-path comprises:

obtaining, for each association type of the plurality of association types, a fourth representation vector corresponding to the association type based on the first representation vector of the target object and at least one second attention weight corresponding to the association type of the plurality of first attention weights; and concatenating a plurality of fourth representation vectors corresponding to the plurality of association types to obtain the second representation vector.

\* \* \* \* \*